(12) United States Patent
Otani et al.

(10) Patent No.: US 9,588,257 B2
(45) Date of Patent: Mar. 7, 2017

(54) PHOTOCHROMIC CURABLE COMPOSITION

(75) Inventors: Toshiaki Otani, Shunan (JP); Junji Takenaka, Shunan (JP); Junji Momoda, Shunan (JP); Shinobu Izumi, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 14/129,822

(22) PCT Filed: Jul. 10, 2012

(86) PCT No.: PCT/JP2012/067618
§ 371 (c)(1),
(2), (4) Date: Dec. 27, 2013

(87) PCT Pub. No.: WO2013/008825
PCT Pub. Date: Jan. 17, 2013

(65) Prior Publication Data
US 2014/0146285 A1 May 29, 2014

(30) Foreign Application Priority Data
Jul. 11, 2011 (JP) ................. 2011-152531

(51) Int. Cl.
G02B 5/23 (2006.01)
G02B 1/04 (2006.01)
C08F 2/44 (2006.01)
C08F 290/06 (2006.01)
C09D 171/02 (2006.01)
C08F 2/46 (2006.01)
C08G 65/332 (2006.01)
C09D 5/29 (2006.01)
G02B 1/10 (2015.01)
C09D 183/12 (2006.01)
C08L 83/12 (2006.01)
C09D 4/00 (2006.01)
C08F 222/10 (2006.01)
C08F 230/08 (2006.01)
C09D 133/06 (2006.01)
G02C 3/00 (2006.01)
G02C 7/02 (2006.01)
G02C 7/10 (2006.01)
C08G 77/14 (2006.01)
(Continued)

(52) U.S. Cl.
CPC ............... G02B 1/041 (2013.01); C08F 2/44 (2013.01); C08F 2/46 (2013.01); C08F 222/1006 (2013.01); C08F 230/08 (2013.01); C08F 290/06 (2013.01); C08G 65/3322 (2013.01); C08L 83/12 (2013.01); C09D 4/00 (2013.01); C09D 5/29 (2013.01); C09D 133/06 (2013.01); C09D 171/02 (2013.01);

C09D 183/12 (2013.01); G02B 1/10 (2013.01); C08G 77/14 (2013.01); C08G 77/20 (2013.01); C08G 77/442 (2013.01); C08G 77/46 (2013.01); G02B 5/23 (2013.01); G02C 7/102 (2013.01)

(58) Field of Classification Search
USPC ............... 252/586; 351/159.61, 163; 522/71; 523/105, 107; 427/162
See application file for complete search history.

(56) References Cited

U.S. PATENT DOCUMENTS 5,914,174 A    6/1999  Gupta et al.
2003/0036579 A1*  2/2003  Momoda ........... C08F 222/1006
                                                   522/75
(Continued)

FOREIGN PATENT DOCUMENTS

EP    1293522 A1    3/2003
EP    1918335 A1    5/2008
(Continued)

OTHER PUBLICATIONS

International Search Report, issued in PCT/JP2012/067618, dated, Sep. 11, 2012.
(Continued)

Primary Examiner — Bijan Ahvazi
(74) Attorney, Agent, or Firm — Birch, Stewart, Kolasch & Birch, LLP

(57) ABSTRACT

A photochromic curable composition comprising, as radically polymerizable component (A), a silsesquioxane component (A1) having a radically polymerizable group and a bifunctional radically polymerizable monomer (A2) represented by the following general formula (1),

[Chemical 1]

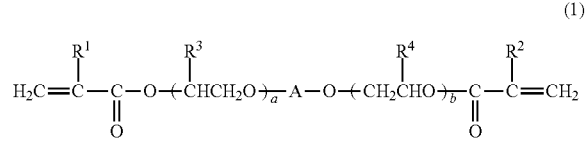

(1)

wherein a is a number of 0 to 30, and b is a number of 0 to 30 on condition that an average value of a+b is 2 to 30,
$R^1$, $R^2$, $R^3$ and $R^4$ are each a hydrogen atom or a methyl group, and
A is a divalent organic group on condition that the number of carbon atoms is 1 to 20, and a photochromic compound (B).

12 Claims, No Drawings

(51) Int. Cl.
  *C08G 77/20* (2006.01)
  *C08G 77/442* (2006.01)
  *C08G 77/46* (2006.01)

(56) References Cited

U.S. PATENT DOCUMENTS

| | | | |
|---|---|---|---|
| 2004/0220292 A1* | 11/2004 | Momoda et al. | 522/71 |
| 2006/0071203 A1 | 4/2006 | Mori et al. | |
| 2008/0033137 A1* | 2/2008 | Tauchi | C08G 65/18 528/27 |
| 2008/0226883 A1 | 9/2008 | Izumi et al. | |
| 2009/0076204 A1* | 3/2009 | Inabe | C08K 5/5419 524/261 |
| 2010/0249264 A1* | 9/2010 | Hu et al. | 523/105 |
| 2010/0249265 A1* | 9/2010 | Engardio et al. | 523/107 |
| 2011/0089385 A1* | 4/2011 | Wada | C07F 7/21 252/589 |
| 2012/0010361 A1 | 1/2012 | Urakawa et al. | |

FOREIGN PATENT DOCUMENTS

| | | |
|---|---|---|
| JP | 61-159753 A | 7/1986 |
| JP | 6-56948 A | 3/1994 |
| JP | 7-97499 A | 4/1995 |
| JP | 2005-15605 A | 1/2005 |
| JP | 2005-309410 A | 11/2005 |
| JP | 2012-82393 A | 4/2012 |
| WO | WO 98/37115 A1 | 8/1998 |
| WO | WO 01/02449 A2 * | 1/2001 |
| WO | WO 01/02449 A2 | 1/2001 |
| WO | WO 03/011967 A1 | 2/2003 |
| WO | WO 2010/116841 A1 | 10/2010 |

OTHER PUBLICATIONS

Partial Supplementary European Search Report for European Application No. 12810958.4, dated Sep. 10, 2015.

* cited by examiner

PHOTOCHROMIC CURABLE COMPOSITION

TECHNICAL FIELD

This invention relates to a novel curable composition useful for the production of optical articles having photochromic properties.

BACKGROUND ART

Photochromic spectacles are the spectacles which, when irradiated with light containing ultraviolet rays such as of sunlight as in the outdoors, quickly develop color in the lenses thereof to work as sunglasses and, in the indoors where there is no irradiation of such light, fade color to work as ordinary transparent spectacles. In recent years, the photochromic spectacles having such features have been demanded more than ever before.

As the photochromic spectacle lenses, in particular, the plastic lenses imparted with photochromic properties have been widely used from the standpoint of small weight and safety. To impart the plastic lenses with photochromic properties, in general, an organic photochromic compound is used; i.e., the photochromic properties are imparted to the plastic lenses by a method called imbibition method or in-mass method.

The imbibition method is a method of expressing photochromic properties by having a photochromic compound imbibed in the surfaces of the plastic lenses.

The in-mass method is a method of directly obtaining lenses having photochromic properties by dissolving a photochromic compound in a polymerizable monomer which is, thereafter, polymerized.

In addition to the above methods, there has, further, been known a method called coating method.

In the coating method, a coating agent (photochromic coating agent) containing a photochromic compound is applied on the surfaces of the plastic lenses and is cured to form a coating (photochromic coating) having photochromic properties.

However, it is not easy to realize the photochromic properties required for the photochromic spectacle lenses relying only upon the thin photochromic coating. At present, therefore, many of the photochromic lenses that are practically used have been produced by the imbibition method or by the in-mass method.

In recent years, however, a photochromic coating agent has been developed by which the photochromic properties can be realized even in the form of a thin photochromic coating, and expectations for the coating method are now sharply increasing.

The advantage of the coating method is that it is, in principle, capable of easily imparting photochromic properties to any lens materials. In the imbibition method, for example, the lens material must be a soft material so that the photochromic compound can be easily dispersed therein. In the in-mass method, too, the lens material (photochromic lenses) must be produced by using a special monomer to express good photochromic properties. The coating method, however, has no such limitations on the lens materials.

Described below are representative photochromic coating agents (a) to (d) that have been proposed to be applied to the spectacle lenses.

(a) A photochromic coating agent comprising an urethane oligomer in which a photochromic compound is dissolved (see a patent document 1).

(b) A photochromic coating agent comprising a polymerizable monomer having a (meth)acrylic group, a polymerizable monomer having two (meth)acrylic groups and a polymerizable monomer having three or more (meth) acrylic groups in combination at a specific ratio and in which a photochromic compound is dissolved (see a patent document 2).

(c) A photochromic coating agent comprising a plurality of kinds of polymerizable monomer components only selected from the polymerizable monomers having two (meth)acrylic) acrylic groups, and in which a photochromic compound is dissolved (see a patent document 3).

(d) A photochromic coating agent comprising a curable composition containing a photochromic compound, an amine compound, a radically polymerizable monomer having a silanol group and/or a radically polymerizable monomer having an isocyanate group (see a patent document 4).

As a coating agent used for the production of optical recording devices, further, there has been proposed the (e) coating agent comprising a solution of a silsesquioxane having a (meth) acrylic group, a poly (meth) acrylate, a photo sensitizer and a radical polymerization initiator, in which a photochromic compound is dissolved or dispersed (see a patent document 5).

In the use of spectacle lenses, on the other hand, it can be contrived to use the photochromic curable composition (i.e., curable composition used for forming lenses) used in the in-mass method as the photochromic coating agent.

As the photochromic curable composition used in the in-mass method, there has been known, for example, (f) a curable composition that contains a polyurethane prepolymer, a silsesquioxane and a photochromic compound (see a patent document 6).

However, the photochromic coatings formed by using the above photochromic coating agents (a) to (d) have low scratch resistance, and tend to be easily scratched in the step of working the lenses, such as in the step of polishing the back surfaces of the lenses for attaining desired degrees or in the step of chamfering the outer circumferential portions to meet the shape of the frames. That is, to obtain good properties of the photochromic spectacle lenses, i.e., to obtain a high color density and a high fading rate, the photochromic coating must be formed soft resulting, however, in a decrease in the scratch resistance.

The above coating agent (e) is suited for the use with the optical recording devices and is blended with the photochromic compound without, however, paying attention to the properties related to reversible color changes (i.e., photochromic properties). Besides, according to the study by the present inventors, it was found that the film formed by using the above coating agent cannot exhibit photochromic properties to a sufficient degree. Specifically, when there is used a compound having an indeno[2,1-f]naphtho[1,2-b]pyran skeleton that exhibits excellent properties as a photochromic compound, the photochromic properties are not almost exhibited.

The above curable composition (f) makes it possible to obtain a cured body having good scratch resistance but is highly viscous and is not suited for use as the photochromic coating agent. Further, if the photochromic lenses are formed by the in-mass method by using the above curable resin, the lenses that are obtained fail to exhibit satisfactory photochromic properties from the standpoint of, specifically, fading rate.

A patent document 7 discloses a coating comprising a polysilsesquioxane-containing polymer which excels in scratch resistance and closely adheres to an antireflection film or the like film when it is placed under an oxidizing condition without, however, quite giving attention to the photochromic property when the coating is blended with a photochromic compound.

PRIOR ART DOCUMENTS

Patent Documents

Patent document 1: Pamphlet of International Laid-Open No. 98/37115
Patent document 2: U.S. Pat. No. 5,914,174
Patent document 3: Pamphlet of International Laid-Open No. 01/02449
Patent document 4: Pamphlet of International Laid-Open No. 03/11967
Patent document 5: JP-A-06-56948
Patent document 6: USP2010/0249264
Patent document 7: USP2010/0249265

OUTLINE OF THE INVENTION

Problems that the Invention is to Solve

It is an object of the present invention to provide a photochromic curable composition capable of forming a cured product that excels in scratch resistance and photochromic properties.

It is another object of the present invention to provide a photochromic curable composition which can be used not only as a material for forming photochromic lenses by the in-mass method but also as the photochromic coating agent.

Means for Solving the Problems

The present inventors have conducted keen study concerning the photochromic curable compositions and, as a result, have discovered that a cured product having not only a high hardness but also improved photochromic properties can be obtained if a radically polymerizable component containing a silsesquioxane having a radically polymerizable group and a bifunctional radically polymerizable monomer having a specific molecular structure, is used in combination with a photochromic compound, and have completed the present invention.

According to the present invention, there is provided a photochromic curable composition comprising:
as radically polymerizable component (A), a silsesquioxane component (A1) having a radically polymerizable group and a bifunctional radically polymerizable monomer (A2) represented by the following general formula (1); and a photochromic compound (B).

[Chemical 1]

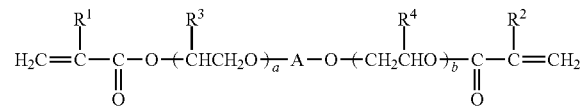
(1)

wherein,
a is a number of 0 to 30, and b is a number of 0 to 30 on condition that an average value of a+b is 2 to 30, $R^1$, $R^2$, $R^3$ and $R^4$ are each a hydrogen atom or a methyl group, and
A is a divalent organic group selected from the following group on condition that the number of carbon atoms is 1 to 20;
alkylene group;
unsubstituted phenylene group;
phenylene group having, as a substituent, a halogen atom or an alkyl group having 1 to 4 carbon atoms; and
a divalent group represented by the following formula (1a), (1b) or (1c);

[Chemical 2]

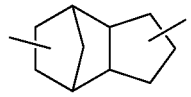
(1a)

[Chemical 3]

(1b)

[Chemical 4]

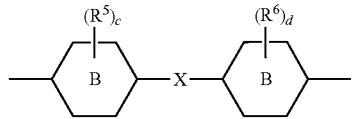
(1c)

wherein in the formula (1c),
$R^5$ and $R^6$ are alkyl groups having 1 to 4 carbon atoms or halogen atoms,
c and d are integers of 0 to 4,
6-membered ring B is a benzene ring or a cyclohexane ring, and when the 6-membered ring B is the benzene ring,
X is a divalent group represented by —O—, —S—, —S(O)$_2$—, —C(O)—, —CH$_2$—, —CH=CH—, —C(CH$_3$)$_2$—, —C(CH$_3$)(C$_6$H$_5$)— or by the following formula (1c-1),

[Chemical 5]

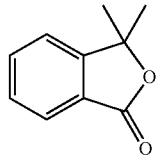
(1c-1)

and when the 6-membered ring B is the cyclohexane ring, X is a divalent group represented by —O—, —S—, —CH$_2$— or —C(CH$_3$)$_2$—.

In the photochromic curable composition of the present invention, it is desired that:
(1) The silsesquioxane component (A1) contains the radically polymerizable groups in a number at a ratio of 10 to 100% per the total number of the substituents bonded to the silicon atoms;
(2) The silsesquioxane component (A1) has a cage structure;
(3) The silsesquioxane component (A1) has a weight average molecular weight of 1,500 to 20,000;

(4) The bifunctional radically polymerizable monomer (A2) contains a long-chain bifunctional radically polymerizable monomer (A2') having an average value a+b of 6 to 30 in the above general formula (1);
(5) The long-chain bifunctional radically polymerizable monomer (A2') is a low-hardness monomer of which the homopolymer has an L-scale Rockwell hardness of not more than 40;
(6) The photochromic compound (B) is a compound having an indeno[2,1-f]naphtho[1,2-b]pyran skeleton;
(7) The photochromic compound (B) is contained in an amount of 0.01 to 20 parts by mass per 100 parts by mass of the radically polymerizable component (A);
(8) The silsesquioxane component (A1) is contained in an amount of 1 to 300 parts by mass per 100 parts by mass of the bifunctional radically polymerizable monomer (A2); and
(9) A photo polymerization initiator or a thermal polymerization initiator is, further, contained.

The photochromic composition of the invention may, further, contain, as the radically polymerizable component (A), other radically polymerizable monomer (A3) that corresponds to neither the silsesquioxane component (A1) nor the bifunctional radically polymerizable monomer (A2).

The other radically polymerizable monomer (A3) is, usually, added in an amount of 1 to 300 parts by mass per 100 parts by mass of the bifunctional radically polymerizable monomer (A2).

The other radically polymerizable monomer (A3) is desirably a polyfunctional radically polymerizable monomer represented by the following general formula (2):

[Chemical 6]

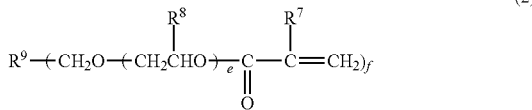

(2)

wherein,
$R^7$ and $R^8$ are hydrogen atoms or methyl groups,
$R^9$ is an organic group having 1 to 10 carbon atoms,
e is a number of 0 to 3, and
f is an integer of 3 to 6.

According to the present invention, further, there is provided a coating agent comprising the above photochromic curable composition.

It is desired that the coating agent has a viscosity of 20 to 500 cps (25° C.)

According to the present invention, there are, further, provided photochromic lenses having a photochromic coating obtained by curing the coating agent on the surfaces of the lens material, and a photochromic cured body obtained by curing the above photochromic curable composition.

Effects of the Invention

The photochromic curable composition of the present invention has an important feature in that a silsesquibxane component (A1) having a radically polymerizable group and a bifunctional radically polymerizable monomer (A2) having a specific molecular structure are used in combination as the radically polymerizable component (A) that is to be combined with the photochromic compound (B). Upon using the radically polymerizable components (A1) and (A2) in combination, it is allowed to form a cured product having excellent photochromic properties.

Therefore, the photochromic coating formed on the surface of the lens material by using the photochromic curable composition of the invention as a coating agent, has a high hardness (excellent scratch resistance) enough for preventing the occurrence of scratches in the steps of working the lenses, such as the step of polishing back surfaces of the lenses and the step of chambering the outer circumferential edges to meet the frames and, besides, exhibits excellent photochromic properties, such as a high color density, a high fading rate and a large repeat durability.

The reasons have not been clarified yet why the photochromic curable composition of the invention forms a cured product that is highly hard and excels in photochromic properties. The present inventors, however, presume the reasons to be as described below.

That is, the silsesquioxane is a polysiloxane formed by a series of T-units (R—$SiO_{3/2}$), and has a three-dimensional chain structure. Therefore, the silsesquioxane component (A1) having the radically polymerizable group contains the silsesquioxane in which at least one of the Rs in the T-units is the radically polymerizable group. Accordingly, the cured product obtained by polymerizing it includes "free space" in which the photochromic compound undergoes the optically reversible reaction due to the stereoscopic chain polymerization. Besides, the silsesquioxane component includes a silicon atom in the molecule thereof, and a cured product containing the component thereof exhibits a high hardness.

On the other hand, the specific bifunctional radically polymerizable monomer (A2) used in the invention is capable of forming a flexible field where the photochromic compound can undergo the optically reversible reaction due to the glycol chain. Of the bifunctional radically polymerizable monomers (A2), the one having a relatively long glycol chain (long-chain bifunctional radically polymerizable monomer (A2')) is capable of forming a more flexible field. Further, when blended with the silsesquioxane component, the bifunctional radically polymerizable monomer (A2) works to adjust the viscosity of the composition that is obtained.

In the cured body obtained by polymerizing the photochromic curable composition of the invention containing the silsesquioxane component (A1), bifunctional radically polymerizable monomer (A2) and photochromic compound (B), therefore, it is considered that the photochromic compound (B) is present in the free space and in the flexible field formed by the silsesquioxane component (A1) and the bifunctional radically polymerizable monomer (A2). As a result, it is considered that the molecules of the photochromic compound are allowed to possess a degree of freedom enough for the optical reversible reaction to take place despite the cured product has a high hardness and, therefore, excellent photochromic properties are obtained such as high color density and high fading rate.

According to the present invention as described above, it is allowed to obtain a cured product having two conflicting properties, i.e., high hardness and photochromic property that could not be attained so far simultaneously.

The photochromic curable composition of the invention having such properties is very useful as a photochromic coating agent, and is used for the production of photochromic lenses relying on the coating method and is, further, favorably used as a curable composition for the production of photochromic lenses relying on the in-mass method.

MODES FOR CARRYING OUT THE INVENTION

The photochromic curable composition of the present invention contains the radically polymerizable component (A) and the photochromic compound (B) as essential components and, further, contains blending agents that have been known per se., as required.

<Radically Polymerizable Components (A)>

As the radically polymerizable component (A), there are used the silsesquioxane component (A1) and the bifunctional radically polymerizable monomer (A2) in combination. There can be, further, used other radically polymerizable monomer (A3) that corresponds to neither the radically polymerizable component (A1) nor (A2).

(A1) Silsesquioxane Components.

The silsesquioxane component (A1) used in the invention as the radically polymerizable component contains the silsesquioxane that has at least one radically polymerizable group.

That is, as described earlier, the silsesquioxane is a polysiloxane of which the basic constituent unit is the T-unit, and is expressed by the following composition formula (3);

$(R-SiO_{3/2})_g$         (3)

In the composition formula (3), g is a number representing the polymerization degree and, usually, lies in a range of 4 to 100, and R is a substituent bonded to the silicon atom.

The silsesquioxane component (A1) (hereinafter often called radically polymerizable silsesquioxane component) used in the present invention comprises an organopolysiloxane that is expressed by the above basic composition formula (3), and contains a silsesquioxane molecule in which at least one of the groups R is a radically polymerizable group.

As the radically polymerizable group, there can be exemplified groups having a (meth)acrylic group, such as (meth)acryloxypropyl group and (3-(meth)acryloxypropyl)dimethyloxy group; groups having an allyl group, such as allylpropyl group and allylpropyldimethylsiloxy group; groups having a vinyl group, such as vinylproyl group, vinyloctyl group and vinyldimethylsiloxy group; and groups having a cyclohexenyl group, such as (4-cyclohexenyl)ethyldimethylsiloxy group. Specifically, a group having the (meth) acryl group is preferred from the standpoint of forming a cured product having a high degree of hardness.

It is, further, desired that the above radically polymerizable groups are present in a number of 10 to 100%, more preferably, 30 to 100% and, specifically, 70 to 100% per the total number of the substituents R contained in the silsesquioxane component (A1) from the standpoint of obtaining a cured product having excellent hardness and photochromic properties.

In the above composition formula (3), the groups R present in a plural number (number of g) in the molecule may be the same or different, or may be the groups other than the radically polymerizable groups on condition that they include a silsesquioxane molecule having at least one radically polymerizable group.

As the group R other than the radically polymerizable group, there can be exemplified hydrogen atom, alkyl group having 1 to 6 carbon atoms, cycloalkyl group having 3 to 8 carbon atoms, alkoxy group having 1 to 6 carbon atoms, halogenated alkyl group having 1 to 6 carbon atoms, unsubstituted phenyl group, halogenated phenyl group and hydroxyl group.

As the alkyl group having 1 to 6 carbon atoms, there can be exemplified methyl group, ethyl group, n-propyl group, isopropyl group, n-butyl group, sec-butyl group, tert-butyl group, n-pentyl group and n-hexyl group.

As the cycloalkyl group having 3 to 8 carbon atoms, there can be exemplified cyclopropyl group, cyclobutyl group, cyclopentyl group, cyclohexyl group, cycloheptyl group and cyclooctyl group.

As the alkoxy group having 1 to 6 carbon atoms, there can be exemplified methoxy group, ethoxy group, n-propoxy group, isopropoxy group, n-butoxy group, sec-butoxy group and tert-butoxy group.

As the halogenated alkyl group having 1 to 6 carbon atoms, there can be exemplified trifluoromethyl group, pentafluoroethyl group, chloromethyl group, 2-chloroethyl group and bromomethyl group.

As the halogenated phenyl group, there can be exemplified 4-chlorophenyl group and 4-bromophenyl group.

The radically polymerizable silsesquioxane component (A1) may contain silsesquioxanes of various structures such as those of the ladder structure, cage structure and random structure so far as a condition is satisfied in that the radically polymerizable group is present, and may contain silsesquioxanes of various structures that are mixed together.

In the present invention, it is desired that the component (A1) contains the silsesquioxanes having the ladder structure and the cage structure and, most preferably, contains the silsesquioxane having the cage structure from such a standpoint that free spaces are built up in the cured product to exhibit excellent photochromic properties.

Here, the silsesquioxane having the ladder structure is represented by the following structural formula (4),

[Chemical 7]

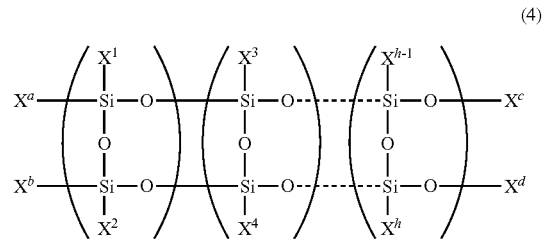

(4)

In the above structural formula (4), $X^1$ to $X^h$ are the groups that correspond to the groups R in the above composition formula (3), and it is desired that at least one of them is the above-mentioned radically polymerizable group.

Further, the terminal groups $X^a$ and $X^b$ are hydroxyl groups or alkyl groups having 1 to 6 carbon atoms, and the terminal groups $X^c$ and $X^d$ are hydrogen atoms or alkoxy groups having 1 to 6 carbon atoms.

In the above structural formula (4), further, h is a number representing the polymerization degree g in the composition formula (3), and, usually, lies in a range of 4 to 100.

When, for example, the radically polymerizable silsesquioxane component (A1) is all the silsesquioxane having the ladder structure, it is desired that the number of the radically polymerizable groups per a molecule of silsesquioxane is 10 to 100%, preferably, 30 to 100% and, specifically, 70 to 100% of (h+4) on the average.

In the invention, the silsesquioxane having the most desired cage structure is represented by the following structural formula (5),

[Chemical 8]

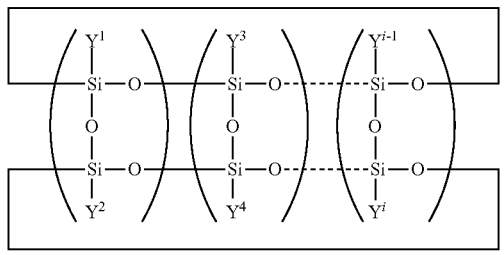

(5)

In the above structural formula (5), $Y^1$ to $Y^i$ are the groups corresponding to the groups R in the composition formula (3), and it is desired that at least one of them is the above-mentioned radically polymerizable group.

In the above structural formula (5), "i" is a number representing the polymerization degree g in the composition formula (3), and, usually, lies in a range of 6 to 12.

When, for example, the radically polymerizable silsesquioxane component (A1) is all the silsesquioxane having the cage structure, it is desired that the number of the radically polymerizable groups per a molecule of silsesquioxane is 10 to 100%, preferably, 30 to 100% and, specifically, 70 to 100% of (i) on the average.

In the silsesquioxane of the cage structure, further, the Si—O—Si bond may often be partly missing (incomplete cage structure). In the incomplete cage structure, an OH group is usually bonded to the silicon atom at a portion where the bridge portion is missing.

Described below are particularly preferred examples of the silsesquioxane of the cage structure represented by the structural formula (5).
(a) The one having a structure represented by T8 with the basic unit as T. Namely, the one having a hexahedral structure in which i=8, and eight Si atoms are bonded to the corners.
(b) The one having a structure represented by T10 with the basic unit as T. Namely, the one having a heptahedral structure in which i=10, and ten Si atoms are bonded to the corners.
(c) The one having a structure represented by T12 with the basic unit as T. Namely, the one having an octahedral structure in which i=12, and twelve Si atoms are bonded to the corners.

In the silsesquioxanes (a) to (c) having the above cage structure, the radically polymerizable groups (e.g., (meth) acryl groups) tend to be easily fixed three-dimensionally (stereoscopically). As a result, it is considered that the cured product has a high degree of hardness forming therein free spaces enough for maintaining excellent photochromic properties such as a high color density and a high fading rate.

In the silsesquioxanes (a) to (c) having the above cage structure, further, it is more desired that the number of the radically polymerizable groups is 2 to 12 per a molecule.

In the above T8, T10 and T12, the groups other than the radically polymerizable groups are as described with reference to the above formula (3).

In the invention, if the whole amount of the component (A1) is 100% by mass, it is desired that the amount of the silsesquioxane of the cage structure is not less than 30% by mass and, specifically, not less than 40% by mass.

In the invention, further, it is desired that the silsesquioxane component (A1) has a weight average molecular weight in a range of 1,500 to 20,000 from the standpoint of decreasing the volumetric shrinkage by polymerization of the photochromic curable composition that is obtained. With the weight average molecular weight lying in the range of 1,500 to 20,000, the volumetric shrinkage by polymerization of the photochromic curable composition becomes small, and the viscosity of the composition can be lowered.

The volumetric shrinkage by polymerization is measured by a method that will be described below. In general, the volumetric shrinkage by polymerization is better small. In the use for spectacle lenses, it is desired that the volumetric shrinkage by polymerization is not larger than 10% and, more preferably, not larger than 8%. The curable composition having a small volumetric shrinkage by polymerization can be used for forming the photochromic lenses by the in-mass method or the coating method. Specifically, when the coating method is employed, deformation of the lens material can be effectively lowered at the time of forming the cured film (photochromic coating). Namely, the curable composition of the invention can be favorably used for forming the coating on the thin lenses and on the highly refractive lenses.

Further, with the weight average molecular weight of the silsesquioxane component (A1) lying in the range of 1,500 to 20,000, the viscosity of the photochromic curable composition becomes small. As a result, the workability is improved and the applicability of the photochromic curable composition is improved when it is used as a coating agent.

From the standpoint of the volumetric shrinkage by polymerization and viscosity of the photochromic curable composition, therefore, it is desired that the silsesquioxane component (A1) has the weight average molecular weight in a range of 2,000 to 10,000.

The radically polymerizable silsesquioxane component (A1) may be the one that is produced by a known method and is placed in the market.

For instance, the following radically polymerizable silsesquioxane components have been placed in the market containing silsesquioxane of the cage structure.
AC-SQ TA-100 manufactured by Toa Gosei Co.:
Polyacryloxypropylpolyorganosiloxane (weight average molecular weight, 2100)
MAC-SQ TM-100 manufactured by To a Gosei Co.:
Polymethacryloxypropylpolyorganosiloxane (weight average molecular weight, 2500)
Q-8 manufactured by To a Gosei Co.:
Octa[(3-methacryloxypropyl)dimethyloxy] silsesquioxane
Q-6 manufactured by To a Gosei Co.:
Octa[(2-(vinyl)dimethyloxy]silsesquioxane The silsesquioxane can be produced by hydrolyzing and condensing a predetermined silyl compound. For example, a high molecular silsesquioxane can be produced according to a method described in a quoted document (Appl. Organometal Chem., 2001, pp. 683-692).

The high molecular silsesquioxane component (A1) used in the present invention can also be produced by mixing a silyl compound (e.g., 3-trimethoxysilylpropyl methacrylate) which is the starting material with 1 to 3 equivalents of water and abase such as sodium hydroxide as a catalyst, and reacting them together at a temperature of 0 to 40° C. For the reaction, there can be, further, used an organic solvent (e.g., alcohols, etc.) for dissolving the starting material and the formed product. When the organic solvent is used, however, it is desired that the amount of use thereof is not more than 4 times (vol/wt) as great as that of the starting material from the standpoint of obtaining the silsesquioxane component (A1) of a high molecular weight. The high molecular silsesquioxane component (A1) obtained by the above method is in the form of a mixture of silsesquioxanes of the cage structure, ladder structure, random structure and incomplete cage structure.

In the invention, the radically polymerizable silsesquioxane component (A1) is, usually, used in an amount of 1 to 300 parts by mass per 100 parts by mass of the bifunctional radically polymerizable monomer (A2) that will be described below though it may vary depending on the use of the curable composition.

Specifically, when the curable composition is used as the photochromic coating agent, it is desired that the radically polymerizable silsesquioxane component (A1) is used in an amount of 1 to 250 parts by mass, more preferably, 1 to 150 parts by mass and, particularly, 10 to 150 parts by mass per 100 parts by mass of the bifunctional radically polymerizable monomer (A2).

When used for forming photochromic lenses by the in-mass method, it is desired that the radically polymerizable silsesquioxane component (A1) is used in an amount of 1 to 150 parts by mass, preferably, 5 to 100 parts by mass and, particularly, 10 to 40 parts by mass per 100 parts by mass of the bifunctional radically polymerizable monomer (A2).

If the amount of the silsesquioxane component (A1) is smaller than the above range, it becomes difficult to maintain the hardness of the cured product suited for the use. Further, if the silsesquioxane component (A1) is used in unnecessarily large amounts, the viscosity of the curable composition becomes so high that it becomes difficult to form the applied layer (photochromic coating) having a uniform thickness, specifically, when the curable composition is used as the photochromic coating agent. The viscosity of the curable composition can be adjusted by using other radically polymerizable monomer (A3) that will be described later.

If the silsesquioxane component (A1) is used in unnecessarily large amounts, further, the oxygen permeability through the cured product becomes high irrespective of its use arousing a problem of decreased repeat durability of the photochromic properties due to oxidation and deterioration of the photochromic compound.

(A2) Bifunctional Radically Polymerizable Monomers:

The bifunctional radically polymerizable monomer (A2) used in combination with the above radically polymerizable silsesquioxane component (A1) is represented by the following general formula (1),

[Chemical 9]

$$H_2C=\overset{R^1}{\underset{\overset{\|}{O}}{C}}-\overset{}{C}-O-(CHCH_2O)_a-A-O-(CH_2CHO)_b-\overset{R^2}{\underset{\overset{\|}{O}}{C}}-\overset{}{C}=CH_2 \quad (1)$$

In the above general formula (1), a is a number of 0 to 30, and b is a number of 0 to 30 on condition that an average value of a+b is 2 to 30.

Here, $R^1$, $R^2$, $R^3$ and $R^4$ are each a hydrogen atom or a methyl group.

Further, A is a divalent organic group selected from the following groups on condition that the number of carbon atoms is 1 to 20;

alkylene group;
unsubstituted phenylene group;
phenylene group having, as a substituent, a halogen atom or an alkyl group having 1 to 4 carbon atoms; and
a divalent group represented by the following formula (1a), (1b) or (1c);

[Chemical 10]

[Chemical 11]

—H₂C—⟨ ⟩—CH₂—

[Chemical 12]

$$-\underset{B}{\overset{(R^5)_c}{\bigodot}}-X-\underset{B}{\overset{(R^6)_d}{\bigodot}}-$$

wherein,
$R^5$ and $R^6$ are alkyl groups having 1 to 4 carbon atoms or halogen atoms,
c and d are integers of 0 to 4,
6-membered ring B is a benzene ring or a cyclohexane ring, and when the 6-membered ring B is the benzene ring,
X is a divalent group represented by —O—, —S—, —S(O)₂—, —C(O)—, —CH₂—, —CH=CH—, —C(CH₃)₂—, —C(CH₃)(C₆H₅)— or by the following formula (1c-1),

[Chemical 13]

(1c-1)

and when the 6-membered ring B is the cyclohexane ring, X is a divalent group represented by —O—, —S—, —CH₂— or —C(CH₃)₂—.

In the above general formula (1), the divalent group A is an organic group having 1 to 20 carbon atoms. As the alkylene group in the above organic group, there can be exemplified ethylene group, propylene group, butylene group or nonylene group.

As the phenylene group having a halogen atom or an alkyl group with 1 to 4 carbon atoms as the substituent, there can be exemplified dimethylphenylene group, tetramethylphenylene group, dibromophenylene group or tetrabromophenylene group.

When the photochromic curable composition of the invention is used as a coating agent, it is desired that the bifunctional radically polymerizable monomer (A2) contains a long-chain bifunctional radically polymerizable monomer (A2') in which an average value of a+b is 6 to 30 in the general formula (1). Upon using the long-chain bifunctional radically polymerizable monomer (A2'), it is allowed to form a flexible field in the cured product in which the photochromic compound can undergo photoreversible reaction. This is important for the cured product (photochromic coating) which is a thin film blended much with the photochromic compound (B) to exhibit excellent photochromic properties. To obtain this effect more conspicuously, it is particularly preferred that the long-chain bifunctional radically polymerizable monomer (A2') has the average value of a+b of 7 to 30 in the general formula (1).

It is, further, desired that the long-chain bifunctional radically polymerizable monomer (A2') used in the invention pertains to a lowly hard monomer of which a homopolymer, in particular, has an L-scale Rockwell hardness of not more than 40 to secure excellent photochromic properties.

Here, the L-scale Rockwell hardness stands for a hardness measured in compliance with the JIS-B7726. There has been known a lowly hard monomer of which a homopolymer (not less than 90% by mass of the monomer has been polymerized) has an L-scale Rockwell hardness of not more than 40 as closely described in, for example, the applicant's Japanese Patent No. 4016119.

When the photochromic curable composition of the invention is used as a coating agent, there can be contained, as the bifunctional radically polymerizable monomer (A2), a short-chain bifunctional radically polymerizable monomer (A2") that will be described below in detail in addition to the above long-chain bifunctional radically polymerizable monomer (A2'). Here, in this case, in order for the coating agent to exhibit excellent effect, it is desired that the average value of a+b of the bifunctional radically polymerizable monomer (A2) is 6 to 30 and, specifically, 7 to 30 as found from the average molecular weight and mass of the long-chain bifunctional radically polymerizable monomer (A2') and from the average molecular weight and mass of the short-chain bifunctional radically polymerizable monomer (A2"). When used as the coating agent, therefore, the bifunctional radically polymerizable monomer (A2) may comprise the long-chain bifunctional radically polymerizable monomer (A2') only.

As the long-chain bifunctional radically polymerizable monomer (A2') that can be favorably used in the invention, there can be exemplified the following monomers.

Polyethylene glycol dimethacrylate (average molecular weight, 536) (average length of the ethylene glycol chain: 9 (average value of a+b, 8; A is an ethylene group)), Polyethylene glycol dimethacrylate (average molecular weight, 736) (average length of the ethylene glycol chain: 14 (average value of a+b, 13; A is an ethylene group)), Polyethylene glycol dimethacrylate (average molecular weight, 1136) (average length of the ethylene glycol chain: 23 (average value of a+b, 22; A is an ethylene group)), Polypropylene glycol dimethacrylate (average molecular weight, 662) (average length of the propylene glycol chain: 9 (average value of a+b, 8; A is a propylene group)), Polyethylene glycol diacrylate (average molecular weight, 508) (average length of the ethylene glycol chain: 9 (average value of a+b, 8; A is an ethylene group)), Polyethylene glycol diacrylate (average molecular weight, 708) (average length of the ethylene glycol chain: 14 (average value of a+b, 13; A is an ethylene group)), Polypropylene glycol diacrylate (average molecular weight, 536) (average length of the propylene glycol chain: 7 (average value of a+b, 6; A is a propylene group)), Polypropylene glycol diacrylate (average molecular weight, 808) (average length of the propylene glycol chain: 12 (average value of a+b, 11; A is a propylene group)), 2,2-Bis[4-methacryloxy(polyethoxy)phenyl]propane (a+b=10), 2,2-Bis[4-methacryloxy(polyethoxy)phenyl]propane (a+b=20), 2,2-Bis[4-methacryloxy(polyethoxy)phenyl]propane (a+b=30), and 2,2-Bis[4-acryloxy(polyethoxy)phenyl]propane (a+b=10).

Among the monomers exemplified above, those of which the divalent organic group A in the general formula (1) is represented by the following formula (1c');

[Chemical 14]

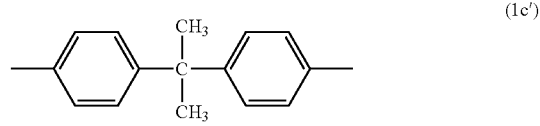

(1c')

and those of which the divalent group A is ethylene group, propylene group or butylene group, produce a high color density and are suited for use as photochromic coating agents, and are adapted to being used for forming photochromic lenses by the in-mass method.

Described below are examples of the above monomers.

2,2-Bis[4-acryloxy(polyethoxy)phenyl]propane (a+b=10), 2,2-Bis[4-methacryloxy(polyethoxy)phenyl]propane (a+b=10), 2,2-Bis[4-methacryloxy(polyethoxy)phenyl]propane (a+b=20), 2,2-Bis[4-methacryloxy(polyethoxy)phenyl]propane (a+b=30), Polyethylene glycol dimethacrylate (average molecular weight, 536) (average length of the ethylene glycol chain: 9 (average value of a+b, 8; A is an ethylene group)), Polyethylene glycol dimethacrylate (average molecular weight, 736) (average length of the ethylene glycol chain: 14 (average value of a+b, 13; A is an ethylene group)), Polypropylene glycol dimethacrylate (average molecular weight, 662) (average length of the propylene glycol chain: 9 (average value of a+b, 8; A is a propylene group)), Polyethylene glycol diacrylate (average molecular weight, 508) (average length of the ethylene glycol chain: 9 (average value of a+b, 8; A is an ethylene group)), Polypropylene glycol diacrylate (average molecular weight, 536) (average length of the propylene glycol chain: 7 (average value of a+b, 6; A is a propylene group)).

The above long-chain bifunctional radically polymerizable monomer (A2') can be used alone or in a mixture of two or more kinds thereof. When used being mixed together, the total mass may be regarded as the reference mass of the bifunctional radically polymerizable monomer (A2).

As the bifunctional radically polymerizable monomer (A2) of the invention, there can be, further, exemplified a short-chain bifunctional radically polymerizable monomer (A2") of which the average value of a+b is less than 6 in the above general formula (1) in addition to the above-mentioned long-chain bifunctional radically polymerizable monomer (A2'). As the short-chain bifunctional radically polymerizable monomer (A2"), there can be exemplified the following monomers:

Triethylene glycol dimethacrylate;
Tetraethylene glycol dimethacrylate;
Tripropylene glycol dimethacrylate;

Tetrapropylene glycol dimethacrylate;
Triethylene glycol diacrylate;
Tetraethylene glycol diacrylate;
Tripropylene glycol diacrylate;
Tetrapropylene glycol diacrylate;
2,2-Bis[4-methacryloxy(polyethoxy)phenyl]propane (a+b=2.3),
2,2-Bis[4-methacryloxy(polyethoxy)phenyl]propane (a+b=2.6),
2,2-Bis[4-methacryloxy(polyethoxy)phenyl]propane (a+b=4),
Ethoxylated cyclohexanedimethanol diacrylate (a+b=4),
2,2-Bis[4-acryloxy(polyethoxy)phenyl]propane (a+b=3),
2,2-Bis[4-acryloxy(polyethoxy)phenyl]propane (a+b=4).

The short-chain bifunctional radically polymerizable monomer (A2") of which a+b is less than 6 and, preferably, not more than 4 as described above, can be favorably used for the applications based on the in-mass method. In this case, it is desired to use a mixture of the long-chain bifunctional radically polymerizable monomer (A2') and the short-chain bifunctional radically polymerizable monomer (A2"). Though the action and effect have not been clarified yet, it is presumed that the long-chain bifunctional radically polymerizable monomer (A2') forms a flexible field in the cured product in which the photochromic compound is allowed to undergo photoreversible reaction and the short-chain bifunctional radically polymerizable monomer (A2") secures the moldability.

In the in-mass method, the photochromic compound (B) may be blended in a small amount but, instead, it becomes necessary to maintain a viscosity suited for the mold. In order for the cured body to exhibit excellent photochromic properties and to be highly suited for being molded yet effectively preventing the occurrence of striae, it is desired to use a mixture of the long-chain bifunctional radically polymerizable monomer (A2') and the short-chain bifunctional radically polymerizable monomer (A2"). Of them, it is desired to use a mixture of the long-chain bifunctional radically polymerizable monomer (A2') and the short-chain bifunctional radically polymerizable monomer (A") at a mass ratio {(A2')/(A2")} of 0.01 to 1 and, more preferably, 0.1 to 0.3. In order for the above effects to be more strikingly exhibited, further, it is desired that the average value of a+b of the mixture thereof is 2.5 to 5.0 and, more preferably, 3.0 to 4.5 as found from the average molecular weight and mass of the long-chain bifunctional radically polymerizable monomer (A2') and the average molecular weight and mass of the short-chain bifunctional radically polymerizable monomer (A2"). When A in the general formula (1) is an ethylene group or a propylene group, the ethyleneoxy group or the propyleneoxy group formed by A is not included in the average value of a+b. When the above mixture is used, further, the reference mass of the bifunctional radically polymerizable monomer (A2) is the total mass of the long-chain bifunctional radically polymerizable monomer (A2') and the short-chain bifunctional radically polymerizable monomer (A2").

(A3) Other Radically Polymerizable Monomers:

In the invention, it is allowable to use a radically polymerizable monomer (A3) other than the above-mentioned radically polymerizable silsesquioxane component (A1) and the bifunctional radically polymerizable monomer (A2). Upon using the radically polymerizable monomer (A3) in combination, it is allowed to further improve the hardness of the cured body without impairing photochromic properties. Namely, use of the other radically polymerizable monomer (A3) is advantageous for the production of photochromic lenses having the photochromic coating, and is very advantageous for improving the workability of the photochromic lenses.

As the other radically polymerizable monomers (A3) that are most desired, there can be exemplified the polyfunctional radically polymerizable monomers represented by the following general formula (2),

[Chemical 15]

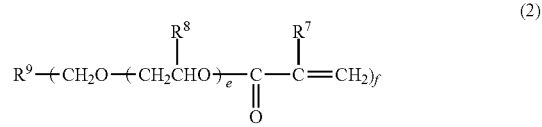

wherein,
$R^7$ and $R^8$ are, independently from each other, hydrogen atoms or methyl groups,
$R^9$ is an organic group having valence of 3 to 6 and having 1 to 10 carbon atoms,
e is an average number and is 0 to 3, and
f is an integer of 3 to 6.

The polyfunctional radically polymerizable monomer represented by the above general formula (2) is effective not only in increasing the hardness of the photochromic cured body that is obtained but also in improving the photochromic properties, specifically, in improving the color density and the fading rate. For the use as the photochromic coating agent and for use as the material for forming photochromic lenses by the in-mass method, in particular, it is desired to use the polyfunctional radically polymerizable monomer of the general formula (2) as the other radically polymerizable monomer (A3).

As the polyfunctional radically polymerizable monomer represented by the above general formula (2), there can be exemplified the following polyfunctional radically polymerizable monomers which can be used alone or in a combination of two or more kinds.

Trimethylolpropane trimethacrylate,
Trimethylolpropane triacrylate
Tetramethylolmethane trimethacrylate,
Tetramethylolmethane triacrylate
Tetramethylolmethane tetramethacrylate,
Tetramethylolmethane tetraacrylate,
Trimethylolpropanetriethylene glycol trimethacrylate,
Trimethylolpropanetriethylene glycol triacrylate,
Ditrimethylolpropane tetramethacrylate,
Ditrimethylolpropane tetraacrylate,
Polyester oligomer having 4 (meth)acrylic groups,
Polyester oligomer having 6 (meth)acrylic groups,
Polyurethane oligomer having 4 (meth) acrylic groups, and
Polyurethane oligomer having 6 (meth)acrylic groups.

Among them, the trimethylolpropane trimethacrylate is specifically desired.

As the other monomer (A3), further, there can be also used a radically polymerizable monomer having an urethane bond in the molecule thereof, such as urethane(meth)acrylate.

The urethane(meth)acrylate is a polymer synthesized by reacting an OH group-containing (meth)acrylate with an urethane prepolymer obtained by reacting a diisocyanate with a polyol. Preferably, there is used the polymer of the aliphatic type without having aromatic ring such as benzene ring in the molecule thereof from the standpoint of attaining, specifically, good light resistance of the cured body and preventing the cured product from developing yellow color upon the irradiation with light.

In the urethane(meth)acrylate of, for example, the above aliphatic type, the diisocyanate used for the production of the urethane prepolymer will be hexamethylene diisocyanate, isophorone diisocyanate, lizine diisocyanate, 2,2,4-trimethylhexamethylene diisocyanate, dimeric acid diisocyanate, isopropylidenebis-4-cyclohexyl isocyanate, dicyclohexylmethane diisocyanate, norbornene diisocyanate or methylcyclohexane diisocyanate.

Further, the polyols used for the reaction with the diisocyanate can be roughly divided into those of high molecular weights and those of low molecular weights. As the high molecular polyols, there can be exemplified polyalkylene glycols having an alkylene oxide (ethylene oxide, propylene oxide, hexamethylene oxide, etc.) with 2 to 6 carbon atoms as a recurring unit; polyester diols such as polycaprolactone diol, etc.; polycarbonate diols; and polybutadiene diols. As the low molecular polyols, there can be exemplified pentaerythritol, ethylene glycol, propylene glycol, 1,3-propane diol, 1,4-butane diol, 1,5-pentane diol, 1,6-hexane diol, 1,9-nonane diol, 1,8-nonane diol, neopentyl glycol, diethylene glycol, dipropylene glycol, 1,4-cyclohexane diol, 1,4-cyclohexane dimethanol, glycerin, trimethylolpropane and pentaerythritol.

As the OH group-containing (meth)acrylate to be reacted with the urethane polymer, further, there can be exemplified 2-hydroxyethyl(meth)acrylate and (meth)acrylic acid ester in which the OH group is coupled to the (meth)acryloyl group via an alkylene oxide chain.

Such urethane(meth)acrylates can be used alone or in a combination of two or more kinds.

It is desired that the above aliphatic urethane (meth) acrylate has a molecular weight of not less than 400 but less than 20,000 from such a standpoint that it serves as a coating agent to impart a suitable degree of viscosity to the photochromic curable composition.

As the other radically polymerizable monomer (A3), further, there can be used a monofunctional radically polymerizable monomer of the following general formula (6) to adjust the properties such as viscosity and the like of the curable composition.

[Chemical 16]

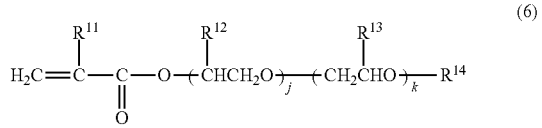

(6)

In the above general formula (6), j is a number of 0 to 25, k is a number of 0 to 25, and it is desired that a value of j+k is in a range of 0 to 25 on the average and, specifically, 0 to 15.

In the general formula (6), further, $R^{11}$, $R^{12}$ and $R^{13}$ are each a hydrogen atom or a methyl group.

Moreover, $R^{14}$ is a hydrogen atom, an alkyl group having 1 to 20 carbon atoms, a cycloalkyl group having 6 to 20 carbon atoms, a phenyl group, a naphthyl group or a glycidyl group.

In the above group $R^{14}$, the phenyl group and the naphthyl group may have, respectively, an alkyl group with 1 to 20 carbon atoms as a substituent.

Described below are preferred examples of the monofunctional radically polymerizable monomer represented by the general formula (6), which may be used alone or in a combination of two or more kinds.

Methoxydiethylene glycol methacrylate,
Methoxytetraethylene glycol methacrylate,
Isostearyl methacrylate,
Isobornyl methacrylate,
Phenoxyethylene glycol methacrylate,
Phenoxyethyl acrylate,
Phenoxydiethylene glycol acrylate,
Naphthoxyethylene glycol acrylate,
Isostearyl acrylate,
Isobornyl acrylate,
Glycidyl methacrylate,
Methoxypolyethylene glycol methacrylate (average length (j+k) of the ethylene glycol chain: 9, average molecular weight: 468),
Methoxypolyethylene glycol methacrylate (average length (j+k) of the ethylene glycol chain: 23, average molecular weight: 1068),
Phenoxypolyethylene glycol acrylate (average length (j+k) of the ethylene glycol chain: 6, average molecular weight: 412).

Among them, the one (e.g., glycidyl methacrylate) of which the group $R^{14}$ is a glycidyl group in the general formula (6) is advantageous in increasing the repeat durability of photochromic properties, and makes it possible to secure excellent photochromic properties when the curable composition is used for either the photochromic coating agent or for the material for forming photochromic lenses by the in-mass method.

In the invention, further, one or two or more kinds of the silane type monofunctional radically polymerizable monomers represented by the following general formula (7) can be used to secure close adhesion of the hard coating to the cured body that is obtained.

[Chemical 17]

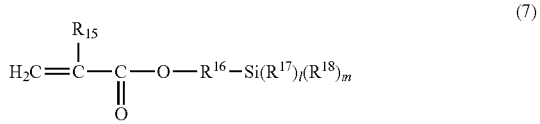

(7)

In the above general formula (7), l is an integer of 1 to 3 and m is an integer of 0 to 2 on condition that l+m=3, $R^{15}$ is a hydrogen atom or a methyl group, $R^{16}$ is an alkylene group having 1 to 10 carbon atoms, such as ethylene group, propylene group or butylene group, $R^{17}$ is an alkoxy group having 1 to 6 carbon atoms, such as methoxy group, ethoxy group or propoxy group, and $R^{18}$ is an alkyl group having 1 to 6 carbon atoms, such as methyl group, ethyl group or propyl group.

Concrete examples of the silane type monofunctional radically polymerizable monomer include γ-methacryloyloxypropyltrimethoxysilane, γ-methacryloyloxypropyltriethoxysilane, γ-methacryloyloxypropylmethyldimethoxysilane and the like.

It is also allowable to use the following alkanediol di(meth)acrylates.

1,3-Butanediol dimethacrylate,
1,6-Hexanediol dimethacrylate,
1,9-Nonanediol dimethacrylate,
1,10-Decanediol dimethacrylate, Neopentyl glycol dimethacrylate,
Tricyclodecanedimethanol dimethacrylate,
1,6-Hexanediol diacrylate,
1,9-Nonanediol diacrylate,
1,10-Decanediol diacrylate,
Neopentyl glycol diacrylate, and
Tricyclodecanedimethanol diacrylate.

Moreover, vinyl type radically polymerizable monomers, such as styrene, α-methylstyrene, α-methylstyrene dimer, divinylbenzene and the like can also be used as other radically polymerizable monomers (A3) to adjust the rate of polymerization at the time of, specifically, thermal polymerization.

As described above, the invention uses the polyfunctional radically polymerizable monomer represented by the general formula (2), urethane(meth)acrylate, monofunctional radically polymerizable monomer of the general formula (6), silane type monofunctional radically polymerizable monomer of the general radically polymerizable monomer either alone or in combination as the other radically polymerizable monomers (A3) in order to further improve the hardness and photochromic properties of the cured body, or to adjust properties such as viscosity and the like of the photochromic curable composition to lie in suitable ranges.

The above other radically polymerizable monomers (A3) should be used in amounts by which they do not impair the photochromic properties achieved by the use of the above radically polymerizable silsesquioxane component (A1) and the bifunctional radically polymerizable monomer (A2) in combination, and are, usually, used in amounts in a range of 1 to 300 parts by mass per 100 parts by mass of the bifunctional radically polymerizable monomer (A2) though the amounts may differ depending on the use of the photochromic curable composition.

When the photochromic curable composition is used, for example, as the photochromic coating agent, the above other radically polymerizable monomer (A3) is used in an amount of 1 to 250 parts by mass and, more preferably, in an amount of 1 to 200 parts by mass and, particularly preferably, in an amount of 1 to 100 parts by mass per 100 parts by mass of the bifunctional radically polymerizable monomer (A2) in order that the effect of the silsesquioxane component (A1) that is added is more conspicuously exhibited. In this case, it is desired that the long-chain bifunctional radically polymerizable monomer (A2') is used as the bifunctional radically polymerizable monomer (A2).

When the curable composition is used as the material for forming photochromic lenses by the in-mass method, it is desired that the other radically polymerizable monomer (A3) is used in an amount of 1 to 100 parts by mass, preferably, 2 to 50 parts by mass and, most preferably, 3 to 30 parts by mass. This makes it possible to attain a viscosity suited for the mold as well as to improve moldability yet effectively preventing the occurrence of striae. In this case, it is desired that the bifunctional radically polymerizable monomer (A2) is a mixture of the long-chain bifunctional radically polymerizable monomer (A2') and the short-chain bifunctional radically polymerizable monomer (A2").

<Photochromic Compound (B)>

As the photochromic compound to be used in combination with the above radically polymerizable component (A), there can be representatively used a fulgide compound, a spirooxazine compound and a chromene compound. In the invention, any of these known photochromic compounds can be used.

As the fulgide compound, for example, though not limited thereto only, there can be used any compounds that have been described in U.S. Pat. No. 4,882,438, 4,960,678 and 5,130,058.

As the spirooxazine compound, further, though not limited thereto only, either, there can be used the compounds disclosed in JP-A-2006-335024, JP-A-2010-59288 and JP-A-2010-59289.

There is no specific limitation on the chromene compound, either, there can be favorably used the chromene compounds which the applicant has proposed thus far, such as those disclosed in U.S. Pat. No. 5,106,998, JP-A-2001-114775, JP-A-2001-031670, JP-A-2001-011067, JP-A-2001-011066, JP-A-2000-347346, JP-A-2000-344762, JP-A-2000-344761, JP-A-2000-327676, JP-A-2000-327675, JP-A-2000-256347, JP-A-2000-229976, JP-A-2000-229975, JP-A-2000-229974, JP-A-2000-229973, JP-A-2000-229972, JP-A-2000-219687, JP-A-2000-219686, JP-A-2000-219685, JP-A-11-322739, JP-A-11-286484, JP-A-11-279171, JP-A-10-298176, JP-A-09-218301, JP-A-09-124645, JP-A-08-295690, JP-A-08-176139 and JP-A-08-157467.

Among the above photochromic compounds, the present invention preferably uses the chromene compound from the standpoint that it not only excels in the repeat durability in the photochromic reversible reaction but also offers a high photochromic color density and a high fading rate.

Among the chromene compounds, further, it is most desired to use those having an indeno[2,1-f]naphtho[1,2-b]pyran skeleton, such as the chromene compounds represented by the following general formula (8),

[Chemical 18]

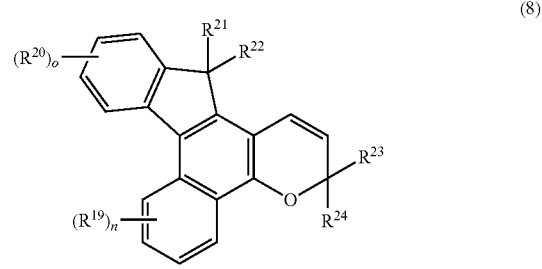

(8)

wherein,
n is an integer of 0 to 4,
o is an integer of 0 to 4, and
$R^{19}$ to $R^{24}$ are substituents.

That is, the compounds having the indeno[2,1-f]naphtho[1,2-b]pyran skeleton exhibit excellent photochromic properties (color density and fading rate). When being contained in the cured body having a specifically high hardness, however, they cannot exhibit their excellent properties to a sufficient degree. When these compounds are used in combination with the above radically polymerizable component (A) according to the present invention, however, they exhibit their excellent photochromic properties to a sufficient degree despite the cured body that is formed has a high degree of hardness. Their excellent photochromic properties are not impaired even when a hard layer such as hard coating is formed on the cured body.

The groups $R^{19}$ to $R^{24}$ in the above general formula (8) are as described below.

(Groups $R^{19}$ and $R^{20}$)

The groups $R^{19}$ and $R^{20}$ are hydroxyl groups, alkyl groups, haloalkyl groups, cycloalkyl groups, alkoxy groups, amino groups, heterocyclic groups including a nitrogen atom which is directly bonded to a carbon atom of the benzene ring, cyano groups, nitro groups, formyl groups, hydroxycarbonyl groups, alkylcarbonyl groups, alkoxycarbonyl groups, halogen atoms, aralkyl groups, aryl groups, aryloxy groups, alkylthio groups or arylthio groups.

Further, when n or "o" is a number of not smaller than 2 and the groups $R^{19}$ or the groups $R^{20}$ are present at positions neighboring to each other, the groups $R^{19}$ or the groups $R^{20}$ may be bonded together to form a group (e.g., methylenedioxy group, ethylenedioxy group, aminomethyleneoxy group or thiomethyleneoxy group) comprising 1 to 8 carbon atoms and 1 to 3 hetero atoms selected from oxygen atom, nitrogen atom and sulfur atom. Here, the nitrogen atom and the carbon atom may be substituted with an alkyl group having 1 to 6 carbon atoms. When n or "o" is a number of not smaller than 2, a plurality of the groups $R^{19}$ or the groups $R^{20}$ may be the same or different.

As the alkyl group, there can be preferably used an alkyl group having 1 to 6 carbon atoms, such as methyl group, ethyl group, n-propyl group, isopropyl group, n-butyl group, sec-butyl group, tert-butyl group, n-pentyl group and n-hexyl group.

The halogen atom possessed by the haloalkyl group is, desirably, a fluorine atom, a chlorine atom or a bromine atom, and it is desired that the haloalkyl group has 1 to 6 carbon atoms. As the preferred haloalkyl group, for example, there can be used trifluoromethyl group, pentafluoroethyl group, chloromethyl group, 2-chloroethyl group and bromomethyl group.

As the preferred cycloalkyl group, there can be preferably used those having 3 to 8 carbon atoms, such as cyclopropyl group, cyclobutyl group, cyclopentyl group and cyclohexyl group.

As the alkoxy group, there can be preferably used those having 1 to 6 carbon atoms, such as methoxy group, ethoxy group, n-propoxy group, isopropoxy group, n-butoxy group, sec-butoxy group and tert-butoxy group.

The amino group is not limited to the unsubstituted amino group (—NH$_2$) but may be the one in which one or two hydrogen atoms bonded to the nitrogen atom are substituted with substituents. As the substituents which may be possessed by the amino group, there can be exemplified alkyl group having 1 to 6 carbon atoms, alkoxy group having 1 to 6 carbon atoms, cycloalkyl group having 3 to 8 carbon atoms, aryl group having 6 to 14 carbon atoms and heteroaryl group having 4 to 12 carbon atoms.

As the alkyl group, alkoxy group and cycloalkyl group, there can be exemplified the same groups as those exemplified above. As the aryl group, there can be exemplified phenyl group, 1-naphthyl group and 2-naphthyl group. As the heteroaryl group, there can be exemplified thienyl group, furyl group, pyrrolinyl group, pyridyl group, benzothienyl group, benzofuranyl group and benzopyrrolinyl group.

As the amino group preferred as the groups $R^{19}$ and $R^{20}$ in the invention, there can be exemplified methylamino group, dimethylamino group, ethylamino group, diethylamino group, phenylamino group and diphenylamino group in addition to the unsubstituted amino group.

The heterocyclic ring is the one that includes a nitrogen atom that is directly bonded to a carbon atom of the benzene ring. Preferred examples thereof include morpholino group, piperidino group, pyrrolidinyl group, piperazino group, N-methylpiperazino group and indolinyl group.

Further, the heterocyclic group may have an alkyl group (e.g., methyl group) having 1 to 6 carbon atoms as a substituent. As the heterocyclic group having such a substituent, there can be exemplified 2,6-dimethylmorpholino group, 2,6-dimethylpiperidino group, and 2,2,6,6-tetramethylpiperidino group.

As the alkylcarbonyl group, there can be preferably used acetyl group and ethylcarbonyl group.

As the alkoxycarbonyl group, there can be preferably used methoxycarbonyl group and ethoxycarbonyl group.

The halogen atom as the group $R^{19}$ or $R^{20}$ may be any one of fluorine atom, chlorine atom, bromine atom or iodine atom.

As the aralkyl group, there can be preferably used those having 7 to 11 carbon atoms, such as benzyl group, phenylethyl group, phenylpropyl group, phenylbutyl group and naphthylmethyl group.

As the aryl group, there can be favorably used those having 6 to 14 carbon atoms, such as phenyl group, 1-naphthyl group and 2-naphthyl group.

As the aryloxy group, there can be preferably used those having 6 to 14 carbon atoms, such as phenoxy group, 1-naphthoxy group and 2-naphthoxy group.

As the alkylthio group, there can be preferably used those having 1 to 6 carbon atoms, such as methylthio group, ethylthio group, n-propylthio group, isopropylthio group, n-butylthio group, sec-butylthio group and tert-butylthio group.

As the arylthio group, there can be preferably used those having 6 to 14 carbon atoms, such as phenylthio group, 1-naphthylthio group and 2-naphthylthio group.

In the aralkyl group, aryl group, aryloxy group and arylthio group, it is allowable that 1 to 13 hydrogen atoms and, specifically, 1 to 4 hydrogen atoms of the benzene ring or the naphthalene ring may have been substituted by the hydroxyl groups, alkyl groups, haloalkyl groups, cycloalkyl groups, alkoxy groups, amino groups, heterocyclic groups, cyano groups, nitro groups, formyl groups, hydroxycarbonyl groups, alkylcarbonyl groups, alkoxycarbonyl groups or halogen atoms.

(Groups $R^{21}$ and $R^{22}$)

In the general formula (8), the groups $R^{21}$ and $R^{22}$ may be hydroxyl groups or the groups the same as the groups $R^{19}$ and $R^{20}$. In this case, the heterocyclic ring includes a nitrogen atom which is directly bonded to a carbon atom of the indene ring.

Further, $R^{21}$ and $R^{22}$ together may constitute a ring with the carbon atom of the indene ring. As such a ring, there can be exemplified an aliphatic ring of which the number of the atoms constituting the ring is 3 to 20, a condensed polycyclic ring formed by condensing the aliphatic ring with the aromatic ring or the aromatic heterocyclic ring, a heterocyclic ring of which the number of the atoms constituting the ring is 3 to 20, or a condensed polycyclic ring formed by condensing the heterocyclic ring with the aromatic ring or the aromatic heterocyclic ring. Specifically desired rings are represented by the following formulas, wherein the position denoted by Z corresponds to a carbon atom of the indene ring to which the groups $R^{21}$ and $R^{22}$ are bonded.

[Chemical 19]

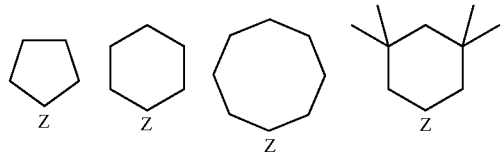

-continued

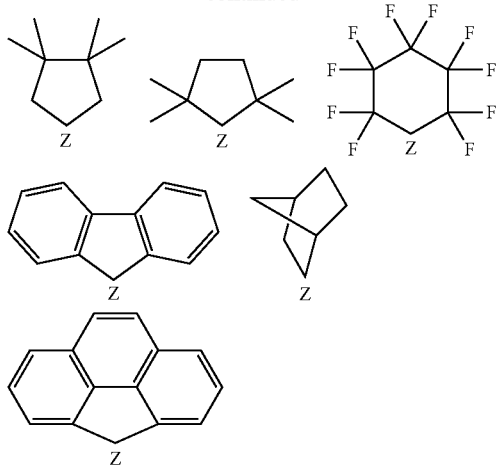

(Groups $R^{23}$ and $R^{24}$)

In the general formula (8), the groups $R^{23}$ and $R^{24}$ are aryl groups, heteroaryl groups or alkyl groups.

As the aryl group and the alkyl group, there can be exemplified the same aryl groups as those exemplified for the group $R^{19}$.

As the heteroaryl group, there can be preferably used those having 4 to 12 carbon atoms, such as thienyl group, furyl group, pyrrolinyl group, pyridyl group, benzothienyl group, benzofuranyl group and benzopyrrolinyl group. In the heteroaryl group, further, 1 to 7 hydrogen atoms and, specifically, 1 to 4 hydrogen atoms may be substituted with substituents. As the substituents, there can be exemplified alkyl group having 1 to 6 carbon atoms, alkoxy group having 1 to 6 carbon atoms, cycloalkyl group having 3 to 8 carbon atoms or halogen atom. These substituents may be the same as those exemplified for the group $R^{19}$.

Further, the groups $R^{23}$ and $R^{24}$ in the general formula (8) may be the groups represented by the following formula (9) or (10).

[Chemical 20]

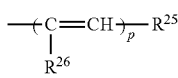
(9)

[Chemical 21]

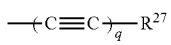
(10)

wherein,
p and q are, respectively, integers of 1 to 3 (usually, 1 for easily obtaining the starting material),
$R^{25}$ is an aryl group or a heteroaryl group,
$R^{26}$ is a hydrogen atom, an alkyl group or a halogen atom, and
$R^{27}$ is an aryl group or a heteroaryl group.

The aryl group, heteroaryl group and alkyl group in the above groups $R^{25}$ to $R^{27}$ are the same as those exemplified for the groups $R^{23}$ and $R^{24}$.

The halogen atom may be any one of fluorine atom, chlorine atom, bromine atom or iodine atom.

Further, the groups $R^{23}$ and $R^{24}$ in the general formula (8) may be bonded together to form an aliphatic hydrocarbon ring or an aromatic hydrocarbon ring.

To obtain particularly excellent photochromic properties, at least either one of the above group $R^{23}$ or $R^{24}$ or, preferably, both of the groups are aryl groups or heteroaryl groups and, specifically, aryl groups or heteroaryl groups of (a) to (d) below.

(a) Aryl group or heteroaryl group having an alkyl group or an alkoxy group as a substituent;

(b) Aryl group or heteroaryl group having an amino group as a substituent;

(c) Aryl group or heteroaryl group having a heterocyclic group as a substituent, the heterocyclic group having a nitrogen atom as a hetero atom, and the nitrogen atom being directly bonded to the aryl group or the heteroaryl group; and (d) Aryl group or heteroaryl group having, as a substituent, a condensed heterocyclic ring formed by the condensation of the heterocyclic group in (c) above with an aromatic hydrocarbon ring or an aromatic heterocyclic ring.

In the aryl groups of (a) to (d) above, there is no specific limitation on the positions of the substituents or on the total number of the substituents. To obtain excellent photochromic properties, however, it is desired that the position for substitution is the third position or the fourth position when the aryl group is a phenyl group. Further, the number of the substituents in this case is, desirably, 1 to 2.

As the preferred aryl group, there can be exemplified 4-methylphenyl group, 4-methoxyphenyl group, 3,4-dimethoxyphenyl group, 4-n-propoxyphenyl group, 4-(N,N-dimethylamino) phenyl group, 4-(N,N-diethylamino)phenyl group, 4-(N,N-diphenylamino)phenyl group, 4-morpholinophenyl group, 4-piperidinophenyl group, 3-(N,N-dimethylamino)phenyl group and 4-(2,6-dimethylpiperidino) phenyl group.

In the heteroaryl groups of (a) to (d) above, there is no specific limitation on the positions of the substituents. There is no specific limitation on the total number of the substituents, either, but the number thereof is, preferably, 1. As the preferred heteroaryl group, there can be exemplified 4-methoxythienyl group, 4-(N,N-dimethylamino)thienyl group, 4-methylfuryl group, 4-(N,N-diethylamino)furyl group, 4-(N,N-diphenylamino)thienyl group, 4-morpholinopyrrolinyl group, 6-piperidinobenzothienyl group, and 6-(N,N-dimethylamino)benzofuranyl group.

Among the chromene compounds represented by the above general formula (8), the following compounds exhibit specifically excellent photochromic properties and can be most desirably used in the invention.

[Chemical 22]

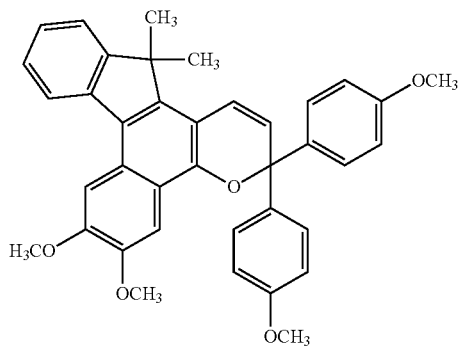

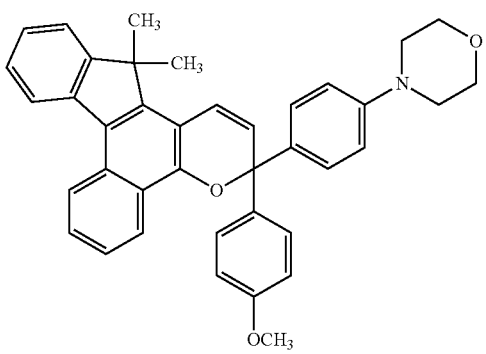

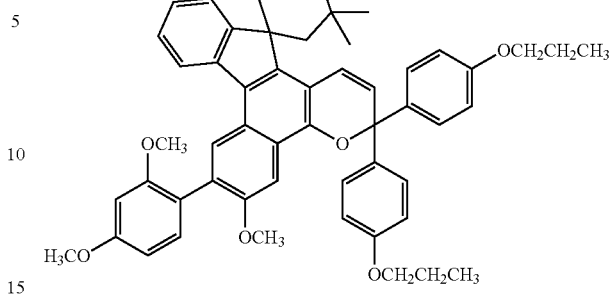

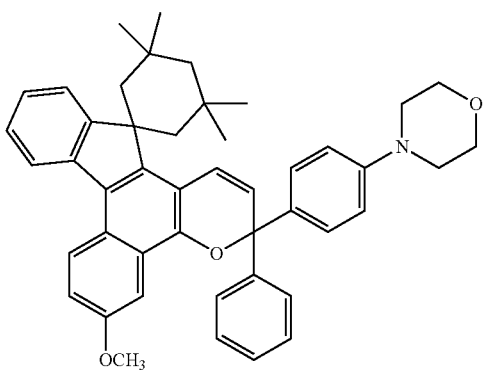

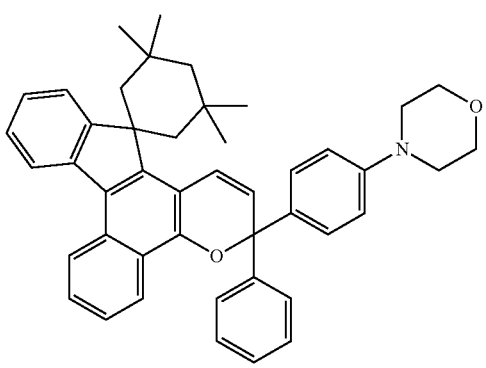

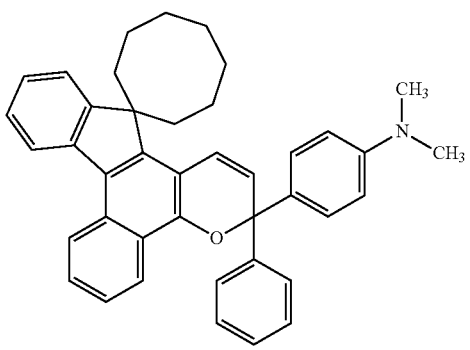

Of the above various kinds of photochromic compounds, any two or more kinds thereof may be suitably used being mixed with the above radically polymerizable component (A) from the standpoint of adjusting the color tone.

In the photochromic curable composition of the present invention, the amount of the photochromic compound (B) that is used may be suitably determined but is, usually, 0.01 to 20 parts by mass per 100 parts by mass of the radically polymerizable component (A) when the photochromic curable composition is to be used for the photochromic spectacle lenses.

Further, when the photochromic spectacle lenses are to be produced by using the photochromic curable composition as the photochromic coating agent, it is desired that the photochromic compound (B) is used in an amount of 0.05 to 20 parts by mass and, more preferably, 0.1 to 15 parts by mass per 100 parts by mass of the radically polymerizable component (A) so that the refractive index of the cured body becomes nearly equal to the refractive index of the spectacle lenses. It is also allowable to change the amount of the photochromic compound (B) depending on the thickness of the photochromic coating that is formed. Namely, when the thickness of the coating is 10 to 30 μm, the amount of the photochromic compound (B) is most desirably 5 to 15 parts by mass per 100 parts by mass of the radically polymerizable component (A) and when the thickness of the coating is 30 to 50 μm, the amount of the photochromic compound (B) is most desirably 0.5 to 5 parts by mass per 100 parts by mass of the radically polymerizable component (A).

<Other Components>

In the photochromic curable composition of the invention, it is, usually, allowable to add a variety of additives that have been known per se. in addition to the above-mentioned components (A) and (B) depending on the use.

To form a cured body upon polymerization, for example, there can be added a suitable radical polymerization initiator depending on the polymerization means. The radical polymerization initiator includes a photo polymerization initiator and a thermal polymerization initiator.

The photo polymerization initiator is used for polymerizing and curing the photochromic curable composition by the irradiation with light such as ultraviolet ray or the like rays. When the curable composition of the present invention is used as the photochromic coating agent, the photo polymerization initiator is, usually, added thereto because of such reasons that the curable composition is cured in a relatively short period of time without being fluidized on the material which is the lens and that the lens will not be deformed by heat.

Described below are examples of the photo polymerization initiator.

Benzoin,
Benzoinmethyl ether,
Benzoinbutyl ether,
Benzophenone,
Acetophenone 4,4'-dichlorobenzophenone.
Diethoxyacetophenone,
2-Hydroxy-2-methyl-1-phenylpropane-1-on,
Benzylmethylketal,
1-(4-Isopropylphenyl)-2-hydroxy-2-methylpropane-1-on,
1-Hydroxycyclohexylphenylketone,
2-Isopropylthioxanthone,
Bis(2,6-dimethoxybenzoyl-2,4,4-trimethyl-pentyl phosphinoxide,
Bis(2,4,6-trimethylbenzoyl)-phenylphosphinoxide,
2,4,6-Trimethylbenzoyldiphenyl-phosphinoxide, and
2-Benzyl-2-dimethylamino-1-(4-morpholinophenyl) butanone-1.

The above photo polymerization initiators can be used in one kind or in a combination of two or more kinds and are, usually, used in an amount of 0.001 to 5 parts by mass per 100 parts by mass of the radically polymerizable component (A).

The thermal polymerization initiator is used for polymerizing and curing the photochromic curable composition by heating. When the curable composition of the present invention is used for forming the photochromic lenses by the in-mass method, it is, usually, a practice to add the thermal polymerization initiator thereto because of the reason that it is suited for the mass production by using an oven for thermal polymerization.

Described below are representative examples of the thermal polymerization initiator.

Diacyl peroxides such as benzoyl peroxide, p-chlorobenzoyl peroxide, decanoyl peroxide, lauroyl peroxide and acetyl peroxide;

Peroxyesters such as t-butylperoxy-2-ethyl hexanoate, t-butylperoxy dicarbonate, cumylperoxy neodecanoate and t-butylperoxy benzoate;

Peroxycarbonates such as diisopropylperoxy dicarbonate, di-2-ethylhexylperoxy dicarbonate and di-sec-butyloxy carbonate; and Azo compounds such as 2,2'-azobisisobutylonitrile, 2,2'-azobis(4-dimethylvalenonitrile), 2,2'-azobis(2-methylbutylonitrile) and 1,1'-azobis(cyclohexane-1-carbonitrile).

The above thermal polymerization initiators can be used in one kind or in a combination of two or more kinds, and their amount of use may differ depending on their kinds, polymerization conditions, composition and kind of the radically polymerizable component (A), and cannot be definitely determined, but is, usually, in a range of 0.01 to 10 parts by mass per 100 parts by mass of the radically polymerizable component (A).

In order to improve the repeat durability of the photochromic compound, rate of developing color, fading rate and moldability, further, the photochromic curable composition of the present invention can be blended with a surfactant, antioxidant, radical-trapping agent, ultraviolet ray stabilizer and ultraviolet ray absorber.

As the surfactant, there can be used any one of the nonionic type, anionic type or cationic type. From the standpoint of solubility in the radically polymerizable component (A), however, it is desired to use the nonionic surfactant.

As the preferred nonionic surfactant, there can be exemplified sorbitan fatty acid ester, polyethylene glycol fatty acid ester and polyoxyethylenealkyl ether. In using the surfactant, two or more kinds thereof may be used being mixed together. The surfactant is added in an amount preferably in a range of 0.1 to 20 parts by mass per 100 parts by mass of the radically polymerizable component (A) and in this range, two or more kinds of the surfactants can be used in combination.

The antioxidant, radical-trapping agent, ultraviolet ray stabilizer and ultraviolet ray absorber are the so-called stabilizers. Preferred examples of the stabilizers include hindered amine light stabilizer, hindered phenol antioxidant, phenol type radical-trapping agent, sulfur type antioxidant, benzotriazole compound and benzophenone compound, which may be used in combination.

The stabilizers are added in amounts, preferably, in a range of 0.001 to 20 parts by mass per 100 parts by mass of the radically polymerizable component (A).

When the photochromic curable composition of the invention is used as the coating agent, the hindered amine light stabilizer and the hindered phenol antioxidant are preferably used from the standpoint of preventing the photochromic compound from being deteriorated by polymerization and curing and for improving repeat durability of the photochromic properties.

As the hindered amine light stabilizer, though not specifically limited, there is preferably used a bis(1,2,2,6,6-pentamethyl-4-piperidyl) sebacate from the standpoint of preventing the photochromic compound from deteriorating. There can be further preferably used the hindered amine light stabilizers which have been placed in the market by Asahi Denka Kogyo Co. in the trade names of ADEKA STAB LA-52, LA-62, LA-77 and LA-82.

As the hindered phenol antioxidant, though not specifically limited, there are favorably used the following hindered phenols from the standpoint of preventing the photochromic compound from deteriorating.

IRGANOX 245 produced by Chiba Specialty chemicals Co.:
Ethylenebis(oxyethylene)bis[3-(5-tert-butyl-4-hydroxy-m-toluoyl) propionate]

INGANOX 1076 produced by Chiba Specialty Chemicals Co.:
Octadecyl-3-(3,5-di-tert-butyl-4-hydroxyphenyl) propionate IRGANOX 1010 produced by Chiba Specialty Chemicals Co.:
Pentaerythritoltetrakis[3-(3,5-di-tert-butyl-4-hydroxyphenyl) propionate]

The hindered amine light stabilizer and the hindered phenol antioxidant are added, in amounts in a range (0.001 to 20 parts by mass) of the above stabilizers, to the photochromic curable composition that is used as the coating agent, and are, preferably, added in amounts in a range of 0.1 to 10 parts by mass and, most preferably, 1 to 10 parts by mass per 100 parts by mass of the radically polymerizable component (A).

The photochromic curable composition of the invention may, further, be blended with demolding agent, anti-tinting agent, antistatic agent, fluorescent dye, dye, pigment, perfume and plasticizer in addition to the above-mentioned variety of additives.

As described above, the photochromic curable composition of the present invention can be blended with a variety of additives in addition to the above-mentioned radically polymerizable component (A) and the photochromic compound (B). Here, however, the total amount of the additives should not be unnecessarily great, and must be so selected as will not impair the photochromic properties or the hardness of the cured body.

<Preparation of the Photochromic Curable Composition>

The photochromic curable composition of the present invention is prepared by weighing predetermined amounts of various radically polymerizable components (A1 to A3), photochromic compound and various additives to be suitably added, and mixing them together. There is no specific limitation on the order of adding the components; i.e., all of the components may be added simultaneously, or the radically polymerizable components only may be mixed in advance and, thereafter, the photochromic compound (B) and other additives may be added and mixed just prior to conducting the polymerization as will be described later.

When used as a coating agent for the optical materials, the photochromic curable composition of the invention should have a viscosity in a range at 25° C. of, preferably, 20 to 500 cPs, more preferably, 50 to 300 cPs and, most preferably, 60 to 200 cPs. Within this range of viscosity, the photochromic coating can be easily formed on, for example, the lens material in a relatively large thickness (10 to 100 μm) so that the photochromic properties can be exhibited to a sufficient degree.

The viscosity is adjusted by selecting the molecular weights of the radically polymerizable silsesquioxane component (A1) and the bifunctional radically polymerizable monomer (A2) that are used as the radically polymerizable component (A) to lie in a suitable range, or by blending other radically polymerizable monomer (A3).

<Forming the Photochromic Cured Body>

There is no specific limitation on the method of obtaining the photochromic cured body from the photochromic curable composition of the invention, and a known polymerization method can be employed depending on the kind of the radically polymerizable monomer that is used and kinds of the radical polymerization initiators if they are used.

When, for example, the thermal polymerization initiator is added as the radical polymerization initiator, the polymerization and curing are conducted upon being heated to a suitable temperature to obtain a photochromic cured body.

Further, when the photo polymerization initiator is added as the radical polymerization initiator, the polymerization and curing can be conducted by the irradiation with ultraviolet rays, α-rays, β-rays or γ-rays, or by using both of them.

When the polymerization is to be carried out by the irradiation with ultraviolet rays, the source of light will be an ultra-high pressure mercury lamp, a high-pressure mercury lamp, a low-pressure mercury lamp, a xenon lamp, a carbon arc lamp, a sterilization lamp, a metal halide lamp or an electrodeless lamp.

Further, when no radical polymerization initiator is added, the polymerization and curing can be carried out by the irradiation with electron rays to form the photochromic cured body.

The above-mentioned means can also be used in combination. For instance, the curing is conducted by the irradiation with, for example, ultraviolet rays and, further as required, the polymerization is completed by being heated.

<Use>

The above photochromic curable composition of the invention can be used by itself as a material having photochromic properties but, specifically desirably, is used as a coating agent for imparting photochromic properties by forming a photochromic coating on the surfaces of an optical material such as spectacle lenses. The photochromic coating formed on the surfaces of the optical material has a defect that it is prone to be easily scratched in the step of working such as polishing or edging. According to the present invention, however, the hardness of the coating (photochromic cured body) can be increased without impairing photochromic properties, and the scratch resistance of the coating is greatly improved.

For instance, the photochromic coating formed on the surface of the optical material by using the photochromic curable composition of the invention has a Vickers hardness of not less than 4 but less than 8 under the load of 10 gf exerted for 30 seconds, which is hard enough without being scratched even through the step of machining the lenses.

Besides, the photochromic coating has a high photochromic color density, a fast fading rate and a high repeat durability.

The optical material on which the photochromic coating is formed may be the one which is required to reversibly change the color upon the irradiation with light and, though there is no specific limitation on the kind thereof, may representatively be spectacle lenses and window glasses of the houses and automobiles.

The spectacle lenses may be made of, either, a plastic material or a glass. Usually, however, the photochromic coating is formed on the spectacle lenses made of the plastic material.

Representative examples of the plastic material for forming the spectacle lenses include (meth)acrylic resin, polycarbonate resin, allylic resin, thiourethane resin, urethane resin and thioepoxy resin. The photochromic curable resin of the invention used as the photochromic coating can be applied to the plastic spectacle lenses made of any of them.

The photochromic coating can be formed on the surfaces of the optical material by applying the photochromic curable composition of the invention used as the photochromic coating agent onto the surfaces of the optical material followed by the polymerization and curing.

The coating agent is applied by using known means such as spin-coating, spray-coating, dip-coating or dip-spin coating.

As described earlier, further, the polymerization and curing are, usually, conducted by being irradiated with light (irradiated with ultraviolet rays). After irradiated with light, the polymerization may, as required, be further completed by heating.

It is, further, desired to pre-treat the surfaces of the optical material prior to applying the coating agent onto the surfaces of the optical material. This enhances the wettability between the coating agent and the surfaces of the optical material, and improves the strength of close adhesion between the photochromic coating and the optical material.

As the pre-treatment, there can be conducted a chemical treatment by using a basic aqueous solution or acidic aqueous treatment utilizing atmospheric-pressure plasma and low-pressure plasma, a corona-discharge treatment or a UV ozone treatment. It is allowable to conduct these pre-treatments in combination, as a matter of course.

When the spectacle lenses are used as the optical material, the chemical treatment by using a basic solution is desired among the above-mentioned pre-treatments. This is because the treating operation is simple and, specifically, a close and strong adhesion is attained between the optical material (spectacle lenses) and the coating formed by using the photochromic curable composition (coating agent) of the present invention.

The pre-treatment based on the basic treatment is, usually, conducted by dipping the optical material in an alkali solution, in an alcohol solution or in a mixed solution thereof. After the treatment, the optical material is rinsed with water such as pure water, ion-exchanged water or distilled water and, thereafter, the surfaces thereof are dried.

As described earlier, it is desired that the photochromic coating formed by applying, polymerizing and curing the coating agent, has a thickness of, preferably, 10 to 100 μm and, more preferably, 20 to 50 μm. If the photochromic coating is too thin, a sufficiently large color density is not obtained when the concentration of the photochromic compound is lowered and, besides, the repeat durability is spoiled. If the coating is too thick, on the other hand, the initial yellow color may appear densely.

As described above, the photochromic coating having a thickness lying in the above range can be easily formed by adjusting the viscosity of the photochromic curable composition at 25° C. to lie in a range of 20 to 500 cp, preferably, 50 to 300 cp and, preferably, 60 to 200 cp.

As described above, the photochromic curable composition of the present invention can be preferably used for forming photochromic lenses by the coating method, and can also be used for forming photochromic optical materials (specifically, lenses) by the in-mass method.

For instance, the cast polymerization is, usually, used when the photochromic lenses are to be formed by the in-mass method. That is, the photochromic curable composition of the invention blended with the radical polymerization initiator (specifically, thermal polymerization initiator) is injected into the mold held by elastomer gaskets or spacers, and is heated and polymerized in an air oven. Thereafter, the polymerized and cured body (photochromic cured body) formed in a predetermined shape is take out from the mold.

The polymerization conditions such as polymerization temperature and the like are set depending on the kind and amount of the radical polymerization initiator and on the kind of the radically polymerizable component (A), and cannot be definitely determined. Generally, however, it is desired to conduct the so-called tapered polymerization by starting the polymerization at a relatively low temperature, mildly elevating the temperature and conducting the curing at a high temperature when the polymerization is finished. Like the temperature, the polymerization time varies depending upon various factors. It is, therefore, desired to determine in advance an optimum time that meets the conditions and to so select the conditions that the polymerization completes in 2 to 24 hours.

The photochromic lenses formed by the coating method or the in-mass method by using the photochromic curable composition of the invention in their form can be put to use through the step of working such as polishing or edging. Usually, however, a hard coating is, further, formed on the lenses to prevent them from getting scratched during the use. This, further, improves the scratch resistance.

Any known coating agent (hard coating agent) can be used without limitation for forming the hard coating. Concretely, there can be used a silane coupling agent, a hard coating agent comprising chiefly the sol of an oxide such as of silicon, zirconium, antimony, aluminum or titanium, and a hard coating agent comprising chiefly an organic high molecular material.

By using the hard coating agent, the hard coating is formed in the same manner as forming the photochromic coating. For instance, after the pre-treatment is conducted based on the basic treatment by using an alkali solution, the hard coating agent is applied and is cured by the heating at around a temperature at which the lens material is not deformed to thereby form the hard coating.

The hard coating can be formed on the photochromic optical material that is formed by the in-mass method by using the photochromic curable composition of the invention as a forming material, the hard coating being closely adhered to the photochromic optical material to a sufficient degree without the need of conducting severe pre-treatment such as polishing treatment, plasma treatment, corona discharge treatment or UV ozone treatment.

The surfaces of the optical articles such as lenses are imparted with photochromic properties by using the photochromic curable composition of the invention. These surfaces can as required be, further, subjected to the working or the secondary treatment, such as anti-reflection treatment, antistatic treatment, etc. by depositing a thin film of a metal oxide such as $SiO_2$, $TiO_2$ or $ZrO_2$ or by applying a thin film of an organic high molecular material in addition to forming the hard coating.

EXAMPLES

The invention will now be described in further detail by way of Examples to which only, however, the invention is in no way limited.

<Molecular Weight of Silsesquioxane>

The molecular weight of the silsesquioxane that was used was measured by the gel permeation chromatography (GPC method).

As the apparatus, there was used a liquid chromatographic apparatus (manufactured by Nihon Waters Co.). As the column, there were used Shodex GPC KF-802 (exclusion limit molecular weight: 5000, manufactured by Showa Denko Co.), Shodex GPC KF-802.5 (exclusion limit molecular weight: 20000, manufactured by Showa Denko Co.) and Shodex GPC KF-803 (exclusion limit molecular weight: 70000, manufactured by Showa Denko Co.).

As the developer, further, a tetrahydrofuran was used, and measurement was taken under the conditions of a flow rate of 1 ml/min. and a temperature of 40° C.

A polystyrene was used as the standard sample, and the weight average molecular weight and the number average molecular weight were found by calculation.

The photochromic lenses prepared in the following Examples were evaluated, and properties such as viscosities and the like of the curable compositions were measured in a manner as described below.

(1) Vickers Hardness.

The photochromic lenses were measured for their Vickers hardness by using a hardness meter with an automatic measuring (reading) device (PMT-X7A, manufactured by Matsuzawa Co.)

Concretely, the Vickers indentator was pushed into the lens under 10 gf for 30 seconds, and the Vickers hardness was obtained from the indentation.

The Vickers hardness serves as an index for if the lenses get scratched in the step of machining the lenses. Roughly speaking, the lenses are not easily scratched if the Vickers hardness exceeds 4.5 but are easily scratched if the Vickers hardness is not more than 4.5.

(2) Color Density.

The photochromic lens was irradiated with ultraviolet rays from a xenon lamp {L-2480 (300W) SHL-100, manufactured by Hamamatsu Photonics Co.} through an aeromass filter (manufactured by Corning Co.) with a beam intensity of 365 nm=2.4 $mW/cm^2$ and 245 nm=24 $\mu W/cm^2$ on the surface of the photochromic coating for 300 seconds at 20° C.±1° C. to develop color. A maximum absorption wavelength at this moment was found by using a spectrophotometer {instantaneous multi-channel photo detector MCPD1000, manufactured by Otsuka Denshi Kogyo Co.}.

From the measured results, the color density was calculated according to the following formula.

Color density=ε(300)−ε(0)

ε(300) is a value of absorbency at the maximum absorption wavelength after irradiated with light for 300 seconds, and ε(0) is a value of absorbency of the cured body at the above wavelength in a state of not irradiated with light.

The lenses having higher values excel more in the photochromic properties.

(3) Fading Half-Life.

After the photochromic lens was irradiated with light for 300 seconds, irradiation of light was discontinued, and the time {t½ (min)} was measured until the absorbency of the cured body at the maximum wavelength decreased down to one-half the value of {ε(300)−ε(0)} and was evaluated as the fading half-life.

The lenses having shorter times have faster fading rates and excel more in the photochromic properties.

(4) Repeat Durability.

In order to evaluate the repeat durability of the color developed by the irradiation with light, the deterioration acceleration test was carried out as described below.

By using a xenon weatherometer {X25 manufactured by Suga Shikenki Co.}, the photochromic lens was deteriorated in an accelerated manner for 200 hours. The color density was evaluated before and after the deterioration; i.e., the lens was measured for its color density ($A_0$) before the test and was measured for its color density ($A_{200}$) after the test.

From the measured results, the remaining ratio that roughly represents the repeat durability was calculated.

Remaining ratio(%)=($A_{200}$/$A_0$)×100

$A_0$ is a value of color density of before the test, and $A_{200}$ is a value of color density of after the test.

The lenses having larger remaining ratios have larger repeat durabilities and excel more in the photochromic properties.

(5) Coating Property.

The coating agent was spin-coated by the above method, and appearance of the coating after cured was evaluated with the eye on the following basis.

○: The coating was free of problem.

Δ: The coating was partly irregular.

X: The coating was defective.

(6) Viscosity.

The coating agent was measured for its viscosity by using a viscometer (Canon Fenske) in a constant-temperature vessel maintained at 25° C.

(7) Volumetric Shrinkage by Polymerization.

The specific gravity ($\rho_m$) of the polymerizable and curable composition and the specific gravity ($\rho_p$) of the obtained cured body were measured, and a value of {($\rho_p$−$\rho_m$)/$\rho_p$×100} was found as the volumetric shrinkage by polymerization (%).

Described below are abbreviations and names of the compounds used in the following examples.

<Radically Polymerizable Components (A)>

Silsesquioxane having a radically polymerizable group (A1); AC-SQ TA-100:
Polyacryloxypropylpolyorganosiloxane (manufactured by To a Gosei Co.).

Relying on the $^{29}$Si-NMR, it was confirmed to be a mixture of the compounds having the cage structure, ladder structure and random structure.

Ratio of radically polymerizable groups, 100%.

Weight average molecular weight, 2100. MAC-SQ TM-100:

Polymethacryloxypropylpolyorganosiloxane {manufactured by To a Gosei Co.}.

Relying on the $^{29}$Si-NMR, it was confirmed to be a mixture of the compounds having the cage structure, ladder structure and random structure.

Ratio of radically polymerizable groups, 100%.

Weight average molecular weight, 2500. PMS1:

Polymethacryloxypropylpolyorganosiloxane.

A 3-trimethoxysilylpropyl methacrylate which was the starting material, 3 equivalents of water relative to the starting material, 0.01 equivalent of sodium hydroxide (catalyst) and a 2-propanol (reaction solvent) in an amount of onetime (vol/wt) as large as the amount of the starting material, were mixed together and were reacted at 20° C. for 3 hours. Thereafter, ethyl acetate was added thereto followed by washing with water, and the solvent thereof was concentrated to obtain the polymethacryloxypropylpolyorganosiloxane (PMS1). Relying on the $^1$H-NMR, it was confirmed that the starting material had been completely consumed. Relying on the $^{29}$Si-NMR, further, it was confirmed to be a mixture of the compounds having the cage structure, ladder structure and random structure.

Ratio of radically polymerizable groups, 100%.

Weight average molecular weight, 6600.

PMS2:

Polymethacryloxypropylpolyorganosiloxane.

A 3-trimethoxysilylpropyl methacrylate which was the starting material, 3 equivalents of water relative to the starting material and 0.01 equivalent of sodium hydroxide (catalyst), were used and reacted at 10° C. for 3 hours but without using the reaction solvent. After the reaction, toluene was added thereto, and the catalyst was removed by washing with water, followed by concentration to obtain the polymethacryloxypropylpolyorganosiloxane (PMS2). Relying on the $^1$H-NMR, it was confirmed that the starting material had been completely consumed. Relying on the $^{29}$Si-NMR, further, it was confirmed to be a mixture of the compounds having the cage structure, ladder structure and random structure.

Ratio of radically polymerizable groups, 100%.

Weight average molecular weight, 18000.

PMS3:

Polymethacryloxypropylpolyorganosiloxane.

A 3-trimethoxysilylpropyl methacrylate which was the starting material, 2 equivalents of water relative to the starting material and 0.01 equivalent of sodium hydroxide (catalyst), were used and reacted at 5° C. for 12 hours but without using the reaction solvent. After the reaction, toluene was added thereto, and the catalyst was removed by washing with water, followed by concentration to obtain the polymethacryloxypropylpolyorganosiloxane (PMS3). Relying on the $^1$H-NMR, it was confirmed that the starting material had been completely consumed. Relying on the $^{29}$Si-NMR, further, it was confirmed to be a mixture of the compounds having the cage structure, ladder structure and random structure.

Ratio of radically polymerizable groups, 100%.

Weight average molecular weight, 34000.

PMS4:

Copolycondensation product of polymethacryloxypropylpolyorganosiloxane and polymethylpolyorganosiloxane.

A starting material which was the mixture of 80 mol % of 3-trimethoxysilylpropyl methacrylate and 20 mol % of methyl trimethoxysilane, 3 equivalents of water relative to the sum of the mol numbers of the starting material, 0.01 equivalent of sodium hydroxide and 2-propanol (reaction solvent) in an amount of one time (vol/wt) as large as the amount of the starting material, were mixed together and were reacted at 20° C. for 4 hours. Thereafter, ethyl acetate was added thereto followed by washing with water, and the solvent thereof was concentrated to obtain the copolycondensation product thereof (PMS4). Relying on the $^1$H-NMR, it was confirmed that the starting material had been completely consumed. Relying on the $^{29}$Si-NMR, further, it was confirmed to be a mixture of the compounds having the cage structure, ladder structure and random structure.

Ratio of radically polymerizable groups, 80%.
Weight average molecular weight, 5100.
PMS5:
Copolycondensation product of polymethacryloxypropylpolyorganosiloxane and polymethylpolyorganosiloxane.

A starting material which was the mixture of 70 mol % of 3-trimethoxysilylpropyl methacrylate and 30 mol % of methyl trimethoxysilane, 0.06 equivalents of hydrogen chloride aqueous solution (1M) relative to the starting material and 2-propanol (reaction solvent) in an amount of 2 times (vol/wt) as large as the amount of the starting material, were mixed together and were reacted at 50° C. for 13 hours. After the reaction, the reaction product was washed with water and was concentrated to obtain the copolycondensation product thereof (PMS5). Relying on the $^1$H-NMR, it was confirmed that the starting material had been completely consumed. Relying on the $^{29}$Si-NMR, further, it was confirmed to be a mixture of the compounds having the ladder structure and random structure.

Ratio of radically polymerizable groups, 70%.
Weight average molecular weight, 2700.
Bifunctional radically polymerizable monomers (A2);
  Long-chain bifunctional radically polymerizable monomers (A2').
  BPE500:
  2,2-Bis(4-methacryloyloxypolyethoxyphenyl) propane.
  Average length (a+b) of the ethylene glycol chain: 10
  Average molecular weight: 804
  L-scale Rockwell hardness of the homopolymer <40
  A-BPE:
  2,2-Bis(4-acryloyloxypolyethoxyphenyl) propane.
  Average length (a+b) of the ethylene glycol chain: 10
  Average molecular weight: 776
  L-scale Rockwell hardness of the homopolymer <20 9G:
  Polyethylene glycol dimethacrylate.
  Average length of the ethylene glycol chain: 9 (but average value of a+b is 8)
  Average molecular weight: 536
  L-scale Rockwell hardness of the homopolymer <20 14G:
  Polyethylene glycol dimethacrylate.
  Average length of the ethylene glycol chain: 14 (but average value of a+b is 13)
  Average molecular weight: 770
  L-scale Rockwell hardness of the homopolymer <20
  A400:
  Polyethylene glycol diacrylate.
  Average length of the ethylene glycol chain: 9 (but average value of a+b is 8)
  Average molecular weight: 508
  L-scale Rockwell hardness of the homopolymer <20
  Short-chain bifunctional radically polymerizable monomers (A2").

3G:
  Triethylene glycol dimethacrylate.
  Average length of the ethylene glycol chain: 3 (but average value of a+b is 2)
  Average molecular weight: 286
  4G:
  Tetraethylene glycol dimethacrylate.
  Average length of the ethylene glycol chain: 4 (but average value of a+b is 3)
  Average molecular weight: 330
  BPE100:
  2,2-Bis(4-methacryloyloxypolyethoxyphenyl) propane.
  Average length (a+b) of the ethylene glycol chain: 2.6
  Average molecular weight: 478
  3PG:
  Tripropylene glycol dimethacrylate.
  Average length of the propylene glycol chain: 3 (but average value of a+b is 2)
  Average molecular weight: 328
Other radically polymerizable monomers (A3).
  TMPT:
  Trimethylolpropane trimethacrylate
  PETA:
  Pentaerythritoltetrakis acrylate
  M90G:
  Methoxypolyethylene glycol methacrylate
  (average length of the ethylene glycol chain: 9, average molecular weight: 468)
  GMA:
  Glycidyl methacrylate
  UA-1:
  Urethane dimethacrylate obtained by reacting the isophorone diisocyanate with the polyethylene glycol monomethacrylate (average length of the ethylene glycol chain: 9) at a mol ratio of 1:2.
  UA-2:
  Urethane dimethacrylate obtained by reacting the 2,2,4-trimethylhexamethylene diisocyanate with the hydroxyethyl acrylate at a mol ratio of 1:2. αMS:
  α-Methylstyrene.
  MSD:
  α-Methylstyrene dimer
<Photochromic Compounds (B)>

[Chemical 23]

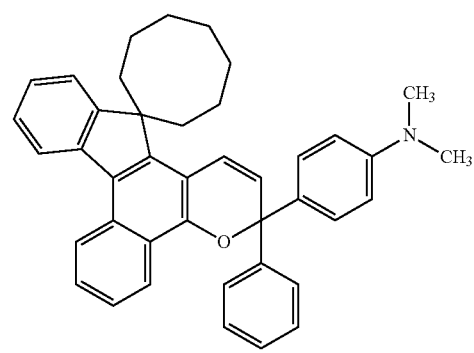

PC1

-continued

[Chemical 24]

PC2

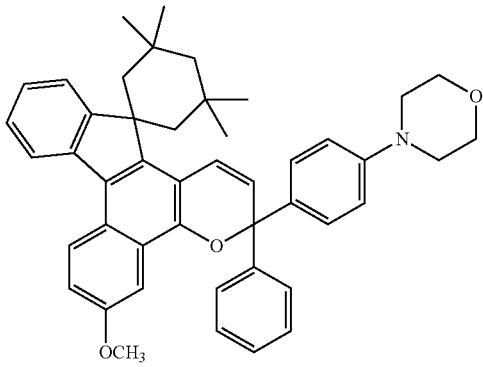

[Chemical 25]

PC3

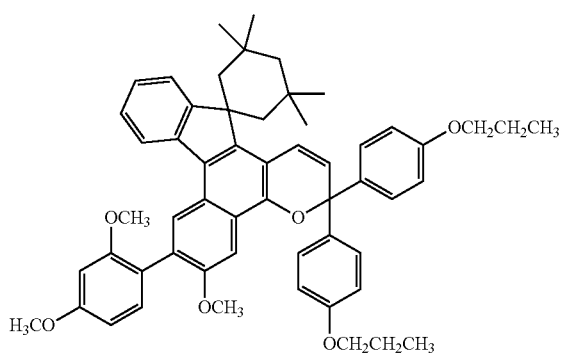

<Polymerization Initiators>
CGI 1800:
A mixture of a 1-hydroxycyclohexylphenylketone and a bis(2,6-dimethoxybenzoyl-2,4,4-trimethyl-pentyl) phosphinoxide (weight ratio: 3 to 1).
Perbutyl ND:
t-Butyl peroxyneodecanoate.
Perocta O:
1,1,3,3-Tetramethylbutylperoxy-2-ethylhexanoate.
<Hindered Amine Light Stabilizer>
TINUVIN 765
Bis(1,2,2,6,6-pentamethyl-4-piperidyl)-sebacate.
Hindered phenol antioxidant.
IRGANOX 245
Ethylenebis(oxyethylene)bis[3-(5-tert-butyl-4-hydroxy-m-toluoyl) propionate].
<Moisture-Curing Primer>
TR-SC-P manufactured by Tokuyama Co.
Evaluating the photochromic coated lenses.

Example 1

The radically polymerizable component (A) was prepared by mixing the following components together.

| | |
|---|---|
| AC-SQ TA-100 (silsesquioxane component (A1)) | 5 parts by mass |
| BPE 500 (bifunctional radically polymerizable monomer (A2)) | 100 parts by mass |

To 100 parts by mass of the thus prepared radically polymerizable component (A), there were added:

| | |
|---|---|
| PC1 (photochromic compound (B)) | 2 parts by mass, |
| TINUVIN 765 (light stabilizer) | 5 parts by mass, |
| IRGANOX 245 (antioxidant) | 3 parts by mass, |
| CGI 1800 (polymerization initiator) | 0.5 parts by mass, | which were mixed together to a sufficient degree to obtain a photochromic curable composition (coating agent) for use as a coating agent.

Next, as the optical material, there was provided a thio-urethane resin plastic lens (MR) having a thickness of 2 mm and a refractive index of 1.60.

By using a spin coater (1H-DX2, manufactured by MIKASA Co.), the above moisture-curable primer was applied onto the surface of the plastic lens (MR) at a revolving speed of 70 rpm for 15 seconds and, thereafter, at 1000 rpm for 10 seconds.

Next, the plastic lens (MR) was spin-coated with about 2 g of the above coating agent at a revolving speed of 60 rpm for 40 seconds and, thereafter, at 600 rpm for 10 to 20 seconds so that the thickness of the photochromic coating was 40 μm. The lens coated on the surface thereof with the coating agent was irradiated with light of a metal halide lamp of an output of 200 mW/cm$^2$ for 90 seconds in a nitrogen gas atmosphere to cure the coating. Thereafter, the heating was conducted at 110° C. for one hour to prepare the photochromic coated lens.

The thus prepared lens was evaluated for its Vickers hardness, density of color that has developed, fading half-life and repeat durability (remaining ratio). Further, the photochromic curable composition (coating agent) prepared above was measured for its viscosity, volumetric shrinkage by polymerization and coating property.

Table 1 shows the basic composition of the photochromic curable composition and Table 6 shows the results that where measured and evaluated.

Examples 2 to 77

Photochromic curable compositions (coating agents) were prepared by conducting the same operation as that of Example 1 but preparing the radically polymerizable component (A) by using the silsesquioxane components (A1) having radically polymerizable groups, bifunctional radically polymerizable monomers (A2) and other polymerizable monomers (A3) shown in Tables 1 to 5 and, further, using the photochromic compounds (B) shown in Tables 1 to 5. Photochromic lenses were obtained therefrom relying on the coating method.

The obtained lenses and the prepared photochromic curable compositions (coating agents) were evaluated in the same manner as in Example 1 to obtain the results as shown in Tables 6 and 7.

TABLE 1

| | (A) Radically polymerizable components (mass parts) | | | |
|---|---|---|---|---|
| Ex. No. | Component (A1) | Component (A2) | Component (A3) | * |
| 1 | AC-SQ TA-100 (5) | BPE500 (100) | — | PC1 (2) |
| 2 | AC-SQ TA-100 (10) | BPE500 (100) | — | PC1 (2) |

TABLE 1-continued

| Ex. No. | (A) Radically polymerizable components (mass parts) | | | * |
|---|---|---|---|---|
| | Component (A1) | Component (A2) | Component (A3) | |
| 3 | AC-SQ TA-100 (25) | BPE500 (100) | — | PC1 (2) |
| 4 | AC-SQ TA-100 (50) | BPE500 (100) | — | PC1 (2) |
| 5 | AC-SQ TA-100 (100) | BPE500 (100) | — | PC1 (2) |
| 6 | AC-SQ TA-100 (250) | BPE500 (100) | — | PC1 (2) |
| 7 | AC-SQ TA-100 (5) | BPE500 (100) | TMPT (10) | PC1 (2) |
| 8 | AC-SQ TA-100 (10) | BPE500 (100) | TMPT (10) | PC1 (2) |
| 9 | AC-SQ TA-100 (15) | BPE500 (100) | TMPT (25) | PC1 (2) |
| 10 | AC-SQ TA-100 (15) | BPE500 (100) | TMPT (50) | PC1 (2) |
| 11 | AC-SQ TA-100 (25) | BPE500 (100) | TMPT (15) | PC1 (2) |
| 12 | AC-SQ TA-100 (35) | BPE500 (100) | TMPT (35) | PC1 (2) |
| 13 | AC-SQ TA-100 (40) | BPE500 (100) | TMPT (60) | PC1 (2) |
| 14 | AC-SQ TA-100 (20) | BPE500 (40) 3G (60) | — | PC1 (2) |

*: (B) (mass pts. with total of A as 100 mass pts.

TABLE 2

| Ex. No. | (A) Radically polymerizable components (mass parts) | | | * |
|---|---|---|---|---|
| | Component (A1) | Component (A2) | Component (A3) | |
| 15 | AC-SQ TA-100 (10) | BPE500 (70) 9G (30) | TMPT (10) GMA (1) | PC1 (2) |
| 16 | AC-SQ TA-100 (15) | BPE500 (70) 9G (30) | TMPT (25) GMA (1) | PC1 (2) |
| 17 | AC-SQ TA-100 (15) | BPE500 (70) 9G (30) | TMPT (35) GMA (1) | PC1 (2) |
| 18 | AC-SQ TA-100 (25) | BPE500 (70) 9G (30) | TMPT (15) GMA (1) | PC1 (2) |
| 19 | AC-SQ TA-100 (30) | BPE500 (60) 9G (40) | TMPT (30) GMA (1) | PC1 (2) |
| 20 | AC-SQ TA-100 (40) | BPE500 (80) 9G (20) | TMPT (60) GMA (1) | PC1 (2) |
| 21 | AC-SQ TA-100 (50) | BPE500 (70) 9G (30) | TMPT (15) GMA (1) | PC1 (2) |
| 22 | AC-SQ TA-100 (60) | BPE500 (80) 9G (20) | TMPT (40) GMA (1) | PC1 (2) |
| 23 | AC-SQ TA-100 (60) | BPE500 (70) 9G (30) | TMPT (60) GMA (1) | PC1 (2) |
| 24 | MAC-SQ TM-100 (15) | BPE500 (80) 9G (20) | TMPT (15) GMA (1) | PC1 (2) |
| 25 | MAC-SQ TM-100 (30) | BPE500 (80) 9G (20) | TMPT (15) GMA (1) | PC1 (2) |
| 26 | MAC-SQ TM-100 (60) | BPE500 (80) 9G (20) | TMPT (15) GMA (1) | PC1 (2) |
| 27 | MAC-SQ TM-100 (100) | BPE500 (80) 9G (20) | TMPT (20) GMA (1) | PC1 (2) |
| 28 | MAC-SQ TM-100 (15) | BPE500 (80) 9G (20) | TMPT (30) GMA (1) | PC1 (2) |
| 29 | MAC-SQ TM-100 (30) | BPE500 (80) 9G (20) | TMPT (40) GMA (1) | PC1 (2) |
| 30 | MAC-SQ TM-100 (40) | BPE500 (80) 9G (20) | TMPT (60) GMA (1) | PC1 (2) |

*: (B) (mass pts. with total of A as 100 mass pts.

TABLE 3

| Ex. No. | (A) Radically polymerizable components (mass parts) | | | * |
|---|---|---|---|---|
| | Component (A1) | Component (A2) | Component (A3) | |
| 31 | MAC-SQ TM-100 (80) | 9G (100) | TMPT (80) GMA (2) | PC2 (2) |
| 32 | MAC-SQ TM-100 (80) | 14G (100) | TMPT (80) GMA (2) | PC2 (2) |
| 33 | AC-SQ TA-100 (15) | BPE500 (100) | TMPT (50) GMA (2) UA-1 (30) | PC2 (2) |
| 34 | AC-SQ TA-100 (15) | BPE500 (100) | TMPT (50) GMA (2) UA-2 (30) | PC2 (2) |
| 35 | AC-SQ TA-100 (15) | BPE500 (80) 9G (20) | TMPT (50) GMA (2) | PC3 (3) |
| 36 | AC-SQ TA-100 (40) | BPE500 (80) 9G (20) | TMPT (60) GMA (2) | PC3 (3) |
| 37 | AC-SQ TA-100 (15) | BPE500 (80) 9G (20) | PETA (50) GMA (2) | PC3 (3) |
| 38 | AC-SQ TA-100 (40) | BPE500 (80) 9G (20) | PETA (60) GMA (2) | PC3 (3) |
| 39 | PMS1 | BPE500 (100) (100) | — | PC1 (2) |
| 40 | PMS1 (30) | BPE500 (80) 9G (20) | TMPT (15) GMA (1) | PC1 (2) |
| 41 | PMS1 (60) | BPE500 (80) 9G (20) | TMPT (15) GMA (1) | PC1 (2) |
| 42 | PMS1 (100) | BPE500 (80) 9G (20) | TMPT (20) GMA (1) | PC1 (2) |
| 43 | PMS1 (30) | BPE500 (80) 9G (20) | TMPT (40) GMA (1) | PC3 (3) |
| 44 | PMS1 (40) | BPE500 (80) 9G (20) | TMPT (60) GMA (1) | PC3 (3) |
| 45 | PMS1 (80) | 14G (100) | TMPT (80) GMA (2) | PC3 (3) |

*: (B) (mass pts. with total of A as 100 mass pts.

TABLE 4

| Ex. No. | (A) Radically polymerizable components (mass parts) | | | * |
|---|---|---|---|---|
| | Component (A1) | Component (A2) | Component (A3) | |
| 46 | PMS2 (100) | BPE500 (100) | — | PC1 (2) |
| 47 | PMS2 (30) | BPE500 (80) 9G (20) | TMPT (15) GMA (1) | PC1 (2) |
| 48 | PMS2 (60) | BPE500 (80) 9G (20) | TMPT (15) GMA (1) | PC1 (2) |
| 49 | PMS2 (100) | BPE500 (80) 9G (20) | TMPT (20) GMA (1) | PC1 (2) |
| 50 | PMS2 (30) | BPE500 (80) 9G (20) | TMPT (40) GMA (1) | PC3 (3) |
| 51 | PMS2 (40) | BPE500 (80) 9G (20) | TMPT (60) GMA (1) | PC3 (3) |
| 52 | PMS2 (80) | 14G (100) | TMPT (80) GMA (2) | PC3 (3) |

TABLE 4-continued

| Ex. No. | (A) Radically polymerizable components (mass parts) | | | * |
|---|---|---|---|---|
| | Component (A1) | Component (A2) | Component (A3) | |
| 53 | PMS3 (100) | BPE500 (100) | — | PC1 (2) |
| 54 | PMS3 (30) | BPE500 (80) 9G (20) | TMPT (15) GMA (1) | PC1 (2) |
| 55 | PMS3 (100) | BPE500 (80) 9G (20) | TMPT (20) GMA (1) | PC3 (3) |
| 56 | PMS3 (30) | BPE500 (80) 9G (20) | TMPT (40) GMA (1) | PC1 (2) |
| 57 | PMS3 (80) | 14G (100) | TMPT (80) GMA (2) | PC2 (2) |
| 58 | PMS4 (100) | BPE500 (100) | — | PC1 (2) |
| 59 | PMS4 (30) | BPE500 (80) 9G (20) | TMPT (15) GMA (1) | PC1 (2) |
| 60 | PMS4 (60) | BPE500 (80) 9G (20) | TMPT (15) GMA (1) | PC1 (2) |

*: (B) (mass pts. with total of A as 100 mass pts.

TABLE 5

| Ex. No. | (A) Radically polymerizable components (mass parts) | | | * |
|---|---|---|---|---|
| | Component (A1) | Component (A2) | Component (A3) | |
| 61 | PMS4 (100) | BPE500 (80) 9G (20) | TMPT (20) GMA (1) | PC3 (3) |
| 62 | PMS4 (30) | BPE500 (80) 9G (20) | TMPT (40) GMA (1) | PC3 (3) |
| 63 | PMS4 (80) | 14G (100) | TMPT (80) GMA (2) | PC3 (3) |
| 64 | PMS5 (100) | BPE500 (100) | — | PC1 (2) |
| 65 | PMS5 (30) | BPE500 (80) 9G (20) | TMPT (15) GMA (1) | PC1 (2) |
| 66 | AC-SQ TA-100 (33) | 3G (100) | — | PC1 (2) |
| 67 | PMS1 (100) | 14G (100) | TMPT (100) GMA (3) | PC1 (2) |
| 68 | PMS1 (200) | 14G (100) | TMPT (150) GMA (5) | PC1 (2) |
| 69 | PMS1 (300) | 14G (100) | TMPT (250) GMA (6) | PC1 (2) |
| 70 | PMS1 (18) | A-BPE (66) 14G (34) | TMPT (60) GMA (1) | PC3 (3) |
| 71 | PMS1 (18) | A-BPE (33) 9G (33) 14G (34) | TMPT (60) GMA (1) | PC3 (3) |
| 72 | PMS1 (45) | A-BPE (20) 9G (40) 14G (40) | TMPT (80) GMA (2) | PC3 (3) |
| 73 | PMS1 (90) | 9G (40) 14G (60) | TMPT (100) GMA (3) | PC3 (3) |
| 74 | PMS1 (120) | 14G (100) | TMPT (100) GMA (2) | PC3 (3) |
| 75 | PMS1 (80) | BPE500 (30) 14G (70) | TMPT (45) GMA (2) | PC3 (3) |
| 76 | PMS1 (90) | BPE500 (50) 14G (50) | TMPT (60) GMA (2) | PC3 (3) |
| 77 | PMS1 (60) | BPE500 (40) 14G (60) | TMPT (25) GMA (2) | PC3 (3) |

*: (B) (mass pts. with total of A as 100 mass pts.

TABLE 6

| Ex. No. | Vickers hardness 10gf* 30 sec. | Photochromic property | | | Viscosity (cPs) | Volumetric shrinkage by polymerization (%) | Coating property |
|---|---|---|---|---|---|---|---|
| | | Color density | Fading half-life (sec.) | Repeat durabiliy Remaining ratio (%) | | | |
| 1 | 4.6 | 1.1 | 75 | 80 | 340 | 6.0 | ○ |
| 2 | 4.8 | 1.1 | 70 | 81 | 350 | 6.0 | ○ |
| 3 | 5.2 | 1.2 | 66 | 80 | 380 | 6.1 | ○ |
| 4 | 5.6 | 1.3 | 60 | 79 | 430 | 6.2 | ○ |
| 5 | 6.4 | 1.4 | 55 | 78 | 490 | 6.3 | ○ |
| 6 | 8.5 | 1.2 | 65 | 62 | 800 | 6.4 | Δ |
| 7 | 5.0 | 1.1 | 72 | 80 | 230 | 6.8 | ○ |
| 8 | 5.2 | 1.1 | 68 | 81 | 240 | 6.8 | ○ |
| 9 | 5.5 | 1.2 | 63 | 80 | 190 | 7.7 | ○ |
| 10 | 5.8 | 1.2 | 60 | 81 | 130 | 8.8 | ○ |
| 11 | 5.6 | 1.2 | 61 | 80 | 300 | 7.1 | ○ |
| 12 | 5.9 | 1.2 | 58 | 80 | 230 | 8.0 | ○ |
| 13 | 6.2 | 1.3 | 57 | 80 | 180 | 8.8 | ○ |
| 14 | 6.5 | 0.9 | 88 | 80 | 130 | 7.6 | ○ |
| 15 | 5.1 | 1.1 | 66 | 81 | 160 | 7.3 | ○ |
| 16 | 5.4 | 1.2 | 61 | 81 | 180 | 8.1 | ○ |
| 17 | 5.7 | 1.2 | 58 | 80 | 150 | 7.0 | ○ |
| 18 | 5.5 | 1.2 | 58 | 81 | 220 | 7.5 | ○ |
| 19 | 5.8 | 1.2 | 56 | 80 | 200 | 8.3 | ○ |
| 20 | 6.1 | 1.3 | 54 | 80 | 170 | 9.0 | ○ |
| 21 | 5.9 | 1.2 | 56 | 80 | 300 | 7.3 | ○ |
| 22 | 6.2 | 1.3 | 54 | 81 | 340 | 8.2 | ○ |
| 23 | 6.5 | 1.3 | 53 | 80 | 220 | 8.9 | ○ |
| 24 | 5.3 | 1.2 | 65 | 80 | 200 | 7.4 | ○ |
| 25 | 5.9 | 1.2 | 56 | 81 | 240 | 7.3 | ○ |
| 26 | 6.5 | 1.3 | 53 | 80 | 390 | 7.2 | ○ |
| 27 | 7.7 | 1.4 | 50 | 79 | 440 | 7.2 | ○ |
| 28 | 5.6 | 1.2 | 58 | 81 | 230 | 7.4 | ○ |
| 29 | 6.2 | 1.3 | 54 | 80 | 240 | 8.4 | ○ |
| 30 | 6.5 | 1.3 | 52 | 80 | 150 | 9.0 | ○ |

TABLE 6-continued

| Ex. No. | Vickers hardness 10gf* 30 sec. | Photochromic property | | Viscosity (cPs) | Volumetric shrinkage by polymerization (%) | Coating property |
|---|---|---|---|---|---|---|
| | | Color density | Fading half-life (sec.) | Repeat durabiliy Remaining ratio (%) | | |
| 31 | 6.2 | 1.1 | 53 | 79 | 110 | 9.7 | ○ |
| 32 | 6.0 | 1.1 | 53 | 80 | 130 | 9.0 | ○ |
| 33 | 6.0 | 1.1 | 70 | 79 | 380 | 8.4 | ○ |
| 34 | 6.4 | 1.1 | 76 | 80 | 300 | 7.5 | ○ |
| 35 | 5.7 | 1.1 | 57 | 85 | 130 | 9.0 | ○ |
| 36 | 6.1 | 1.1 | 53 | 84 | 180 | 9.0 | ○ |
| 37 | 5.4 | 1.0 | 57 | 85 | 130 | 9.0 | ○ |
| 38 | 5.8 | 1.0 | 53 | 85 | 180 | 9.0 | ○ |
| 39 | 6.9 | 1.4 | 55 | 80 | 460 | 4.8 | ○ |
| 40 | 6.1 | 1.3 | 54 | 81 | 270 | 6.7 | ○ |
| 41 | 6.6 | 1.3 | 52 | 81 | 390 | 6.1 | ○ |
| 42 | 7.8 | 1.5 | 50 | 78 | 420 | 5.9 | ○ |
| 43 | 6.4 | 1.4 | 52 | 79 | 270 | 7.9 | ○ |
| 44 | 6.7 | 1.3 | 50 | 80 | 180 | 8.4 | ○ |
| 45 | 6.4 | 1.2 | 50 | 81 | 150 | 8.0 | ○ |

TABLE 7

| Ex. No. | Vickers hardness 10gf* 30 sec. | Photochromic property | | | Viscosity (cPs) | Volumetric shrinkage by polymerization (%) | Coating property |
|---|---|---|---|---|---|---|---|
| | | Color density | Fading half-life (sec.) | Repeat durabiliy Remaining ratio (%) | | | |
| 46 | 6.8 | 1.4 | 54 | 82 | 480 | 4.5 | ○ |
| 47 | 6.1 | 1.3 | 54 | 81 | 310 | 6.6 | ○ |
| 48 | 6.5 | 1.4 | 50 | 80 | 450 | 6.0 | ○ |
| 49 | 7.7 | 1.5 | 49 | 80 | 470 | 5.6 | ○ |
| 50 | 6.4 | 1.3 | 52 | 79 | 310 | 7.8 | ○ |
| 51 | 6.6 | 1.4 | 50 | 81 | 200 | 8.3 | ○ |
| 52 | 6.4 | 1.2 | 51 | 81 | 170 | 7.9 | ○ |
| 53 | 6.6 | 1.4 | 53 | 82 | 740 | 4.4 | Δ |
| 54 | 6.0 | 1.1 | 51 | 80 | 360 | 6.5 | ○ |
| 55 | 7.7 | 1.3 | 48 | 80 | 500 | 5.5 | Δ |
| 56 | 6.3 | 1.2 | 52 | 79 | 270 | 7.8 | ○ |
| 57 | 6.0 | 1.0 | 50 | 80 | 180 | 7.8 | ○ |
| 58 | 6.8 | 1.2 | 56 | 81 | 490 | 4.7 | ○ |
| 59 | 6.2 | 1.0 | 58 | 80 | 270 | 6.6 | ○ |
| 60 | 6.3 | 1.2 | 55 | 81 | 250 | 6.1 | ○ |
| 61 | 7.7 | 1.2 | 52 | 80 | 440 | 5.8 | ○ |
| 62 | 6.3 | 1.1 | 55 | 79 | 250 | 7.9 | ○ |
| 63 | 5.9 | 1.0 | 53 | 81 | 140 | 8.0 | ○ |
| 64 | 7.1 | 0.7 | 93 | 73 | 450 | 4.2 | ○ |
| 65 | 6.7 | 0.8 | 90 | 72 | 220 | 5.8 | ○ |
| 66 | 7.4 | 0.8 | 130 | 80 | 60 | 8.4 | ○ |
| 67 | 10.0 | 1.1 | 62 | 82 | 160 | 8.2 | ○ |
| 68 | 12.4 | 0.9 | 68 | 81 | 220 | 8.0 | ○ |
| 69 | 13.3 | 0.8 | 73 | 82 | 300 | 8.4 | ○ |
| 70 | 6.4 | 1.2 | 46 | 77 | 350 | 8.8 | ○ |
| 71 | 7.8 | 1.0 | 71 | 78 | 150 | 9.2 | ○ |
| 72 | 9.8 | 1.0 | 65 | 79 | 170 | 9.1 | ○ |
| 73 | 11.5 | 1.1 | 52 | 83 | 160 | 8.2 | ○ |
| 74 | 12.2 | 1.3 | 45 | 82 | 180 | 7.9 | ○ |
| 75 | 8.3 | 1.0 | 54 | 81 | 150 | 7.2 | ○ |
| 76 | 7.4 | 1.1 | 46 | 80 | 140 | 7.6 | ○ |
| 77 | 6.6 | 1.0 | 50 | 82 | 190 | 6.9 | ○ |

Comparative Examples 1 to 3

The operation was carried out in the same manner as in Example 1 but preparing the radically polymerizable components (A) by using the silsesquioxane components (A1), bifunctional radically polymerizable monomers (A2) and other polymerizable monomers (A3) shown in Table 8, and the properties were evaluated. The results were as shown in Table 9.

TABLE 8

| | (A) Radically polymerizable components (mass parts) | | | |
|---|---|---|---|---|
| Comp. Ex. No. | Component (A1) | Component (A2) | Component (A3) | * |
| 1 | — | BPE500 (100) | — | PC1 (2) |
| 2 | AC-SQ TA-100 (50) | — | TMPT (50) | PC1 (2) |

TABLE 8-continued

| | (A) Radically polymerizable components (mass parts) | | | |
|---|---|---|---|---|
| Comp. Ex. No. | Component (A1) | Component (A2) | Component (A3) | * |
| 3 | PMS1 (50) | — | TMPT (50) GMA (1) | PC1 (2) |

*: (B) (mass pts. with total of A as 100 mass pts.

TABLE 9

| | Vickers hardness 10gf* 30 sec. | Photochromic property | | | | Volumetric shrinkage by polymerization (%) | Coating property |
|---|---|---|---|---|---|---|---|
| Comp. Ex. No. | | Color density | Fading half-life (sec.) | Repeat durabiliy Remaining ratio (%) | Viscosity (cPs) | | |
| 1 | 3.6 | 1.0 | 63 | 80 | 330 | 6.0 | ○ |
| 2 | 10.2 | 1.2 | 63 | 32 | 180 | 10.8 | X |
| 3 | 10.9 | 1.2 | 60 | 41 | 190 | 10.6 | X |

No silsesquioxane component (A1) was used in Comparative Example 1. Therefore, a low Vickers viscosity was exhibited by the photochromic lens having the photochromic coating obtained by using the photochromic curable composition.

The bifunctional radically polymerizable monomer (A2) was used in neither Comparative Example 2 nor Comparative Example 3. Therefore, the photochromic lenses obtained in Comparative Examples 2 and 3 developed many cracks in the coating. Besides, their repeat durability was very low.

Evaluating the photochromic optical materials prepared by the in-mass method.

Example 78

The radically polymerizable component (A) was prepared by mixing the following components together:
Silsesquioxane component (A1);
  PMS1: 20 parts by mass
Bifunctional radically polymerizable monomer (A2);
  Long-chain bifunctional radically polymerizable monomer (A2').
    BPE 500: 10 parts by mass
  Short-chain bifunctional radically polymerizable monomer (A2").
    BPE 100: 60 parts by mass
    4G: 30 parts by mass
  Other radically polymerizable monomers;
    GMA: 1 part by mass
    αMS: 8 parts by mass
    MSD: 1 part by mass
To 100 parts by mass of the thus prepared radically polymerizable component (A), there were added:

| PC1 (photochromic compound(B)) | 0.04 parts by mass, |
| TINUVIN 765 (light stabilizer) | 0.1 parts by mass, |
| Perbutyl ND (polymerization initiator) | 1 part by mass |

Perocta O (polymerization initiator) 0.1 part by mass, which were mixed together to a sufficient degree to obtain a photochromic curable composition for use as a material for forming a photochromic optical material by in-mass method.

The curable composition was poured into a mold constituted by a glass plate and a gasket of an ethylene/vinyl acetate copolymer, and was cast-polymerized.

By using an air oven, the polymerization was conducted by gradually elevating the temperature from 30° C. to 90° C. over a time of 18 hours and holding the temperature at 90° C. for 2 hours. After the polymerization has finished, the polymer was removed from the mold of the glass.

The obtained photochromic cured body (2 mm thick) as a sample was irradiated with ultraviolet rays from a xenon lamp {L-2480 (300W) SHL-100, manufactured by Hamamatsu Photonics Co.} through an aeromass filter (manufactured by Corning Co.) at 20° C.±1° C. for 120 seconds to develop color, and was measured for its photochromic properties.

The irradiation with ultraviolet rays was such that the beam intensity on the surface of the polymer was 2.4 mW/cm$^2$ at 365 nm and 24 μW/cm$^2$ at 245 nm.

The photochromic properties were evaluated by the same method as that of evaluating the above photochromic coated lenses.

As for the moldability, the photochromic cured body (2 mm thick) was illuminated with light from a high-pressure mercury lamp, and the degrees of striae that were projected were evaluated on the following basis.

○: No striae was formed.

Δ: Striae were formed to some extent.

X: Striae were formed conspicuously.

Examples 79 to 84

Photochromic curable compositions shown in Table 10 were prepared, and from which cured bodies were obtained in the same manner as in Example 78 and were evaluated. When A in the general formula (1) is the ethylene group or the propylene group, the average values a+b in Table 10 exclude the ethyleneoxy group or the propyleneoxy group formed by A. The results were as shown in Table 11.

TABLE 10

| | (A) Radically polymerizable components (mass parts) | | | | | |
|---|---|---|---|---|---|---|
| | | Component (A2) | | | | |
| Ex. No. | Component (A1) | Component (A2') | Component (A2") | Ave. value of a + b | Component (A3) | * |
| 78 | PMS1 (20) | BPE500(10) | BPE100(60) 4G(30) | 3.2 | GMA(1) αMS(8) MSD(1) | PC1 (0.04) |
| 79 | PMS1 (30) | BPE500(20) A400(10) | BPE100(70) | 4.1 | GMA(1) αMS(8) MSD(1) | PC1 (0.04) |
| 80 | PMS1 (20) | BPE500(10) | BPE100(60) 4G(30) | 3.2 | TMPT(10) GMA(1) αMS(8) MSD(1) | PC1 (0.04) |
| 81 | PMS1 (20) | A400(30) | 3PG(70) | 3.5 | UA-2(30) M90G(7) GMA(1) MSD(2) | PC1 (0.04) |
| 82 | PMS1 (15) | A400(20) | 3PG(50) 4G(30) | 3.3 | M90G(7) GMA(1) αMS(1) MSD(1) | PC1 (0.04) |
| 83 | PMS1 (100) | BPE500(100) | — | 10 | GMA(1) αMS(8) MSD(1) | PC1 (0.04) |
| 84 | MAC-SQ TM-100(20) | BPE500(10) | BPE100(60) 4G(30) | 3.2 | GMA(1) αMS(8) MSD(1) | PC1 (0.04) |

* (B) (mass pts. with total of A as 100 mass pts.)

TABLE 11

| Ex. No. | Vickers hardness 10gf* 30 sec. | Photochromic property | | | Viscosity (cPs) | Volumetric shrinkage by polymerization (%) | Moldability |
|---|---|---|---|---|---|---|---|
| | | Color density | Fading half-life (sec.) | Repeat durabiliy Remaining ratio (%) | | | |
| 78 | 13.2 | 1.2 | 68 | 92 | 62 | 7.5 | ○ |
| 79 | 12.6 | 1.2 | 62 | 90 | 82 | 7.0 | ○ |
| 80 | 14.6 | 1.2 | 60 | 91 | 58 | 8.0 | ○ |
| 81 | 8.4 | 1.1 | 70 | 90 | 115 | 8.2 | ○ |
| 82 | 10.1 | 1.1 | 66 | 90 | 48 | 7.5 | ○ |
| 83 | 11.0 | 1.1 | 62 | 88 | 135 | 6.8 | Δ |
| 84 | 12.0 | 1.1 | 72 | 92 | 76 | 7.7 | ○ |

Comparative Examples 4 and 5

The operation was carried out in the same manner as in Example 78 but preparing the radically polymerizable components (A) by using the silsesquioxane components (A1), bifunctional radically polymerizable monomers (A2) and other polymerizable monomers (A3) shown in Table 12, and the properties were evaluated. The results were as shown in Table 13.

TABLE 12

| | (A) Radically polymerizable components (mass parts) | | | | | |
|---|---|---|---|---|---|---|
| | | Component (A2) | | | | |
| Comp. Ex. No. | Component (A1) | Component (A2') | Component (A2") | Ave. value of a + b | Component (A3) | * |
| 4 | — | BPE500(10) | BPE100(60) 4G(30) | 3.2 | GMA(1) αMS(8) MSD(1) | PC1 (0.04) |
| 5 | PMS1 (20) | — | — | — | M90G(10) GMA(1) αMS (8) MSD(1) | PC1 (0.04) |

* (B) (mass pts. with total of A as 100 mass pts.)

TABLE 13

| Comp. Ex. No. | Vickers hardness 10gf* 30 sec. | Photochromic property | | | Viscosity (cPs) | Volumetric shrinkage by polymerization (%) | Moldability |
|---|---|---|---|---|---|---|---|
| | | Color density | Fading half-life (sec.) | Repeat durabiliy Remaining ratio (%) | | | |
| 4 | 8.0 | 0.8 | 165 | 91 | 52 | 8.4 | ○ |
| 5 | 10.0 | 0.9 | 95 | 43 | 135 | 5.0 | X |

No silsesquioxane component (A1) was used in Comparative Example 4. Therefore, the cured body obtained by using the photochromic curable composition failed to exhibit sufficiently high color density or fading rate. The Vickers hardness was small, either.

No bifunctional radically polymerizable monomer (A2) was used in Comparative Example 5. Therefore, the cured body obtained by using the photochromic curable composition failed to exhibit sufficiently high color density or durability. The moldability was poor, either.

The invention claimed is:

1. A photochromic coating agent comprising a photochromic curable composition which includes:
    as radically polymerizable component (A), a silsesquioxane component (A1) having a radically polymerizable group and a bifunctional radically polymerizable monomer (A2), and a photochromic compound (B);
    said silsesquioxane component (A1) being contained in an amount of 1 to 150 parts by mass per 100 parts by mass of the bifunctional radically polymerizable monomer (A2);
    said silsesquioxane component (A1) having a weight average molecular weight of 2,000 to 10,000 and containing said radically polymerizable groups in a number at a ratio of 70 to 100% per the total number of substituents bonded to the silicon atoms; and
    said bifunctional radically polymerizable monomer (A2) being represented by the following general formula (1);

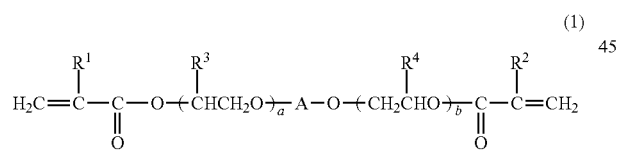

(1)

wherein,
"a" is a number of 0 to 30, and "b" is a number of 0 to 30 on condition that an average value of "a+b" is 2 to 30,
$R^1$, $R^2$, $R^3$ and $R^4$ are each a hydrogen atom or a methyl group, and
"A" is a divalent organic group, on condition that the number of carbon atoms is 1 to 20, which is selected from the group consisting of:
    alkylene group;
    unsubstituted phenylene group;
    phenylene group having, as a substituent, a halogen atom or an alkyl group having 1 to 4 carbon atoms; and
    a divalent group represented by the following formula (1a), (1b) or (1c);

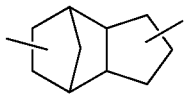

(1a)

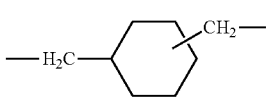

(1b)

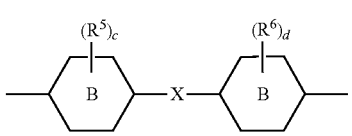

(1c)

wherein in the formula (1 c),
$R^5$ and $R^6$ are alkyl groups having 1 to 4 carbon atoms or halogen atoms,
c and d are integers of 0 to 4,
6-membered ring B is a benzene ring or a cyclohexane ring, and when the 6-membered ring B is the benzene ring, X is a divalent group represented by —O—, —S—, —S(O)$_2$—, —C(O)—, —CH$_2$—, —CH═CH—, —C(CH$_3$)$_2$—, —C(CH$_3$)(C$_6$H$_5$)— or by the following formula (1c-1),

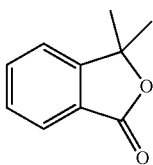

(1c-1)

and when the 6-membered ring B is the cyclohexane ring, X is a divalent group represented by —O—, —S—, —CH$_2$— or —C(CH$_3$)$_2$—, and
said silsesquioxane component (A1) being an organopolysiloxane comprising a basic constituent unit represented by the following composition formula (3),

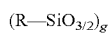

wherein R represents substituents bonded to silicon atoms, at least one of which being a radically polymerizable group, and g is a number in a range of 4 to 100.

2. The photochromic coating agent according to claim 1, wherein said silsesquioxane component (A1) contains a silsesquioxane that has a cage structure.

3. The photochromic coating agent according to claim 1, wherein said bifunctional radically polymerizable monomer (A2) contains a long-chain bifunctional radically polymerizable monomer (A2') having an average value a+b of 6 to 30 in the above general formula (1).

4. The photochromic coating agent according to claim 3, wherein said long-chain bifunctional radically polymerizable monomer (A2') is a low-hardness monomer of which the homopolymer has an L-scale Rockwell hardness of not more than 40.

5. The photochromic coating agent according to claim 1, wherein said photochromic compound (B) is a compound having an indeno[2,1-f]naphtho[1,2-b]pyran skeleton.

6. The photochromic coating agent according to claim 1, wherein said photochromic compound (B) is contained in an amount of 0.01 to 20 parts by mass per 100 parts by mass of said radically polymerizable component (A).

7. The photochromic coating agent according to claim 1, further containing a photo polymerization initiator or a thermal polymerization initiator.

8. The photochromic coating agent according to claim 1, further containing other radically polymerizable monomer (A3) that corresponds to neither said silsesquioxane component (A1) nor said bifunctional radically polymerizable monomer (A2), the other radically polymerizable monomer (A3) being contained in an amount of 1 to 300 parts by mass per 100 parts by mass of said bifunctional radically polymerizable monomer (A2).

9. The photochromic coating agent according to claim 8, wherein the other radically polymerizable monomer (A3) contains a polyfunctional radically polymerizable monomer represented by the following general formula (2):

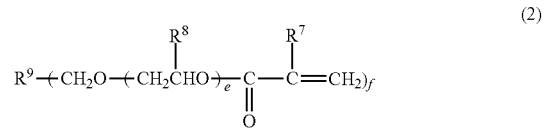

wherein,
$R^7$ and $R^8$ are hydrogen atoms or methyl groups,
$R^9$ is an organic group having 1 to 10 carbon atoms,
e is a number of 0 to 3, and
f is an integer of 3 to 6.

10. The photochromic coating agent according to claim 1 having a viscosity of 20 to 500 cps at 25° C.

11. A photochromic lens having a photochromic coating obtained by curing the photochromic coating agent of claim 1 on a surface of a lens material.

12. The photochromic lens according to claim 11, wherein the photochromic coating has a thickness of 10 to 100 μm.

* * * * *